(12) United States Patent
Nakagawa

(10) Patent No.: US 10,326,681 B2
(45) Date of Patent: Jun. 18, 2019

(54) SYSTEM AND METHOD TO ANALYZE ROUTE INFORMATION IN A NETWORK

(71) Applicant: FUJITSU LIMITED, Kawasaki-shi, Kanagawa (JP)

(72) Inventor: Yukihiro Nakagawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 9 days.

(21) Appl. No.: 15/824,510

(22) Filed: Nov. 28, 2017

(65) Prior Publication Data

US 2018/0159770 A1 Jun. 7, 2018

(30) Foreign Application Priority Data

Dec. 2, 2016 (JP) .................................. 2016-234821

(51) Int. Cl.
*H04L 12/24* (2006.01)
*H04L 12/26* (2006.01)
(Continued)

(52) U.S. Cl.
CPC .............. *H04L 43/10* (2013.01); *H04L 41/06* (2013.01); *H04L 41/12* (2013.01); *H04L 43/103* (2013.01);
(Continued)

(58) Field of Classification Search
CPC ......... H04L 41/06; H04L 41/12; H04L 43/10; H04L 43/103; H04L 45/24; H04L 45/26; H04L 45/38; H04L 45/64; H04L 45/74; H04L 69/22
See application file for complete search history.

(56) References Cited

U.S. PATENT DOCUMENTS

2016/0142291 A1* 5/2016 Polland ................... H04L 45/36
370/392
2017/0295100 A1* 10/2017 Hira ....................... H04L 47/125
370/235
(Continued)

FOREIGN PATENT DOCUMENTS

JP 2009-296084 12/2009

OTHER PUBLICATIONS

Kim et al., "In-band Network Telemetry (INT)", Jun. 2016, searched on Nov. 22, 2016, URL:http://p4.org/wp-content/uploads/fixed/INT/INT-current-spec.pdf, pp. 1-28.
(Continued)

*Primary Examiner* — Timothy J Weidner
(74) *Attorney, Agent, or Firm* — Staas & Halsey LLP

(57) ABSTRACT

A system includes a first switching apparatus, a first information processing apparatus including a first processor and a second information processing apparatus including a second processor, wherein the first processor generates a first packet including first port information indicating a first port of the first switching apparatus, and transmits the first packet to the first switching apparatus, the first switching apparatus transmits the first packet from the first port, the second processor receives the first packet, the first packet including first route information indicating a first route through which the first packet has passed between the first switching apparatus and the second switching apparatus, and transmits a second packet including the first port information and the first route information to the first information processing apparatus, and first information processing apparatus stores the first route information and the first port information included in the second packet.

16 Claims, 31 Drawing Sheets

(51) Int. Cl.
  *H04L 12/707* (2013.01)
  *H04L 12/715* (2013.01)
  *H04L 12/721* (2013.01)
  *H04L 12/741* (2013.01)
  *H04L 29/06* (2006.01)

(52) U.S. Cl.
  CPC .............. *H04L 45/24* (2013.01); *H04L 45/26* (2013.01); *H04L 45/38* (2013.01); *H04L 45/64* (2013.01); *H04L 45/74* (2013.01); *H04L 69/22* (2013.01)

(56) References Cited

U.S. PATENT DOCUMENTS

| | | | |
|---|---|---|---|
| 2018/0212798 A1* | 7/2018 | Shang | H04L 12/4633 370/392 |
| 2018/0278514 A1* | 9/2018 | Chadha | H04L 43/0864 370/392 |

OTHER PUBLICATIONS

Adams et al., "NetNORAD: Troubleshooting networks via end-to-end probing", Facebook blog, searched on Dec. 1, 2016, https://code.facebook.com/posts/1534350660228025/netnorad-troubleshooting-networks-via-end-to-end-probing/, 8 pgs.

Petr Lapukhov, "Move Fast, Unbreak Things! Network debugging at scale", NANOG 66, searched on Dec. 1, 2016, https://www.nanog.org/sites/default/files/Lapukhov_Move_Fast_Unbreak.pdf, pp. 1-46.

\* cited by examiner

FIG. 12

| TRANSMISSION SOURCE MAC ADDRESS (INTERNAL HEADER) | DESTINATION MAC ADDRESS (INTERNAL HEADER) | DESTINATION VTEP | SOURCE PORT OF EXTERNAL HEADER |
|---|---|---|---|
| 00:01:02:03:04:05 | 00:01:02:03:04:15 | VTEP4 | 0x0001 |
| ⋮ | ⋮ | ⋮ | ⋮ |

FIG. 13

| DESTINATION VTEP | MAC ADDRESS OF DESTINATION VTEP (EXTERNAL HEADER) |
|---|---|
| VTEP4 | 00:01:02:03:04:05 |
| ⋮ | ⋮ |

FIG. 15

| FORWARD ROUTE/ BACKWARD ROUTE | SOURCE PORT | SWITCH ON ROUTE |
|---|---|---|
| FORWARD ROUTE | 0x0001 | 201 |
| | 0x0002 | 202 |
| | ⋮ | ⋮ |
| | 0xFFFF | 201 |
| BACKWARD ROUTE | 0x0001 | 202 |
| | 0x0002 | 203 |
| | ⋮ | ⋮ |
| | 0xFFFF | 202 |

FIG. 16

| DESTINATION VTEP | FORWARD ROUTE/ BACKWARD ROUTE | SWITCH ON ROUTE | SOURCE PORT |
|---|---|---|---|
| VTEP4 | FORWARD ROUTE | 201 | 0x0001 |
| | | 202 | 0x0002 |
| | | 203 | 0x0003 |
| | | 204 | 0x0004 |
| | BACKWARD ROUTE | 201 | 0x0004 |
| | | 202 | 0x0001 |
| | | 203 | 0x0002 |
| | | 204 | 0x0003 |

FIG. 20

| DESTINATION VTEP | SOURCE PORT BEFORE CHANGE | SOURCE PORT AFTER CHANGE |
|---|---|---|
| VTEP4 | 0X0001 | 0x0002 |
| ⋮ | ⋮ | ⋮ |

FIG. 26

| TRANSMISSION SOURCE MAC ADDRESS | DESTINATION MAC ADDRESS | DESTINATION VTEP | SOURCE PORT OF EXTERNAL HEADER OF FORWARD ROUTE | SOURCE PORT OF EXTERNAL HEADER OF BACKWARD ROUTE |
|---|---|---|---|---|
| 00:01:02:03:04:05 | 00:01:02:03:04:15 | VTEP4 | 0x0001 | 0x0004 |

FIG. 29

| TRANSMISSION SOURCE MAC ADDRESS | DESTINATION MAC ADDRESS | DESTINATION VTEP | SOURCE PORT OF EXTERNAL HEADER OF FORWARD ROUTE | SOURCE PORT OF EXTERNAL HEADER OF BACKWARD ROUTE |
|---|---|---|---|---|
| 00:01:02:03:04:15 | 00:01:02:03:04:05 | VTEP1 | 0x0004 | 0x0001 |

SYSTEM AND METHOD TO ANALYZE ROUTE INFORMATION IN A NETWORK

CROSS-REFERENCE TO RELATED APPLICATION

This application is based upon and claims the benefit of priority of the prior Japanese Patent Application No. 2016-234821, filed on Dec. 2, 2016, the entire contents of which are incorporated herein by reference.

FIELD

The embodiments discussed herein are related to a system and a method.

BACKGROUND

With regard to a network in a data center, to cope with an increase in communications between servers, the network may be structured in a manner that a plurality of routes that can be simultaneously used exist between the servers in some cases. For example, a certain literature discloses a technology for a multipath communication by a communication apparatus that can be coupled to a plurality of networks.

In addition, in order that a cloud service can be provided without delay, an overlay network based on a VXLAN (Virtual eXtensible Local Area Network) technology is structured, and a virtual network may be structured by tunnel coupling of servers of respective tenants in some cases. In the overlay network based on the VXLAN technology, a transfer route of a packet varies based on information set in an external header of an encapsulated packet.

A certain literature discloses a technology for checking statuses of respective routes in the overlay network based on the VXLAN technology. Specifically, a plurality of packets are transmitted with respect to a list of specified target hosts while source port numbers in the external headers of the packets are changed, and reachability of the packet is determined based on a response to the transmission.

A value set in the external header is calculated by a hash calculation of information included in an internal header, but an algorithm of the hash calculation and an algorithm of a transfer by a switch depend on an implementation, which is not necessarily revealed in advance. For this reason, in a case where a communication abnormality occurs, it is not possible to identify the transfer routes of the packets depending on the above-mentioned technology, and it is not possible to control the transfer routes of the packets. In addition, the number of probe packets transmitted to check the statuses of the respective routes is increased in a case where the above-mentioned technology is used, which affects the transfer of the normal packet other than the probe packet. Related-art technology literatures include Japanese Laid-open Patent Publication No. 2009-296084, Aijay Adams and two others, "NetNORAD: Troubleshooting networks via end-to-end probing", Changhoon Kim, Parag Bhide, Ed Doe, Hugh Holbrook, Anoop Ghanwani, Dan Daly, Mukesh Hira, Bruce Davie, "In-band Network Telemetry (INT)", and Petr Lapukhov, "Move Fast, Unbreak Things! Network debugging at scale".

SUMMARY

According to an aspect of the invention, a system includes a first switching apparatus coupled to a network and including a plurality of ports, a first information processing apparatus coupled to the first switching apparatus and including a first memory and a first processor coupled to the first memory, a second switching apparatus coupled to the network, and a second information processing apparatus coupled to the second switching apparatus and including a second memory and a second processor coupled to the second memory, wherein the first processor is configured to generate a first packet including first port information indicating a first port included in the plurality of ports of the first switching apparatus, and transmit the first packet to the first switching apparatus, the first switching apparatus is configured to receive the first packet transmitted from the first processor, and transmit the first packet from the first port indicated by the first port information, the second switching apparatus is configured to receive the first packet transmitted from the first switching apparatus, and transmit the first packet to the second information processing apparatus, the second processor is configured to receive the first packet from the second switching apparatus, the first packet received by the second processor including first route information indicating a first route through which the first packet has passed in the network between the first switching apparatus and the second switching apparatus, and transmit a second packet including the first port information and the first route information to the first information processing apparatus via the second switching apparatus in accordance with reception of the first packet, and the first processor is configured to receive the second packet via the first switching apparatus, and store, in the first memory, the first route information and the first port information included in the second packet.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 12 illustrates an example of data stored in a capsule control data storage unit according to the first exemplary embodiment.

FIG. 13 illustrates an example of data stored in a VTEP data storage unit.

FIG. 15 illustrates an example of data stored in a route data storage unit.

FIG. 16 illustrates an example of data stored in a search result storage unit.

FIG. 20 illustrates an example of data stored in a route change data storage unit.

FIG. 26 illustrates an example of the data stored in the capsule control data storage unit according to the second exemplary embodiment.

FIG. 29 illustrates an example of the data stored in the capsule control data storage unit according to the second exemplary embodiment.

DESCRIPTION OF EMBODIMENTS

First Exemplary Embodiment

Figure 1:
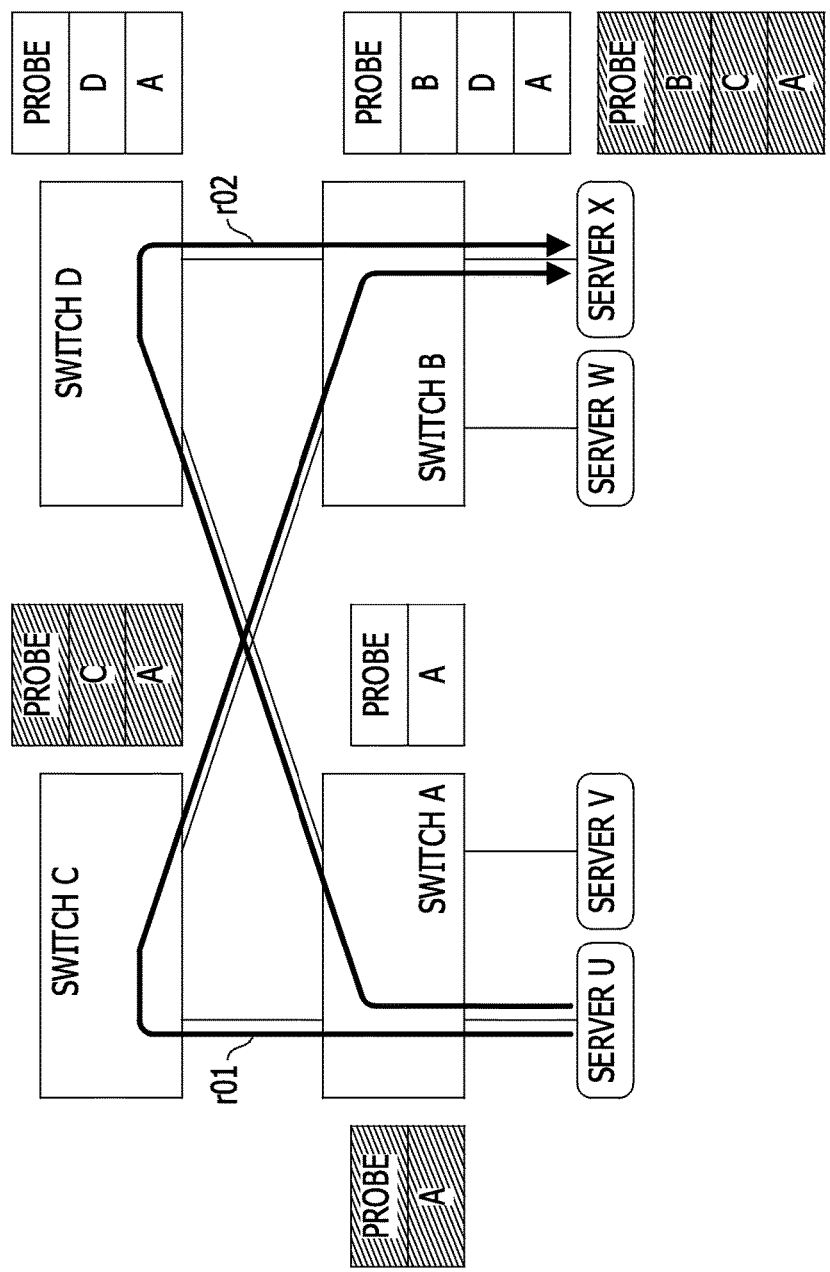
FIG. 1 is an explanatory diagram for describing an outline according to a first exemplary embodiment.
Figure 2:
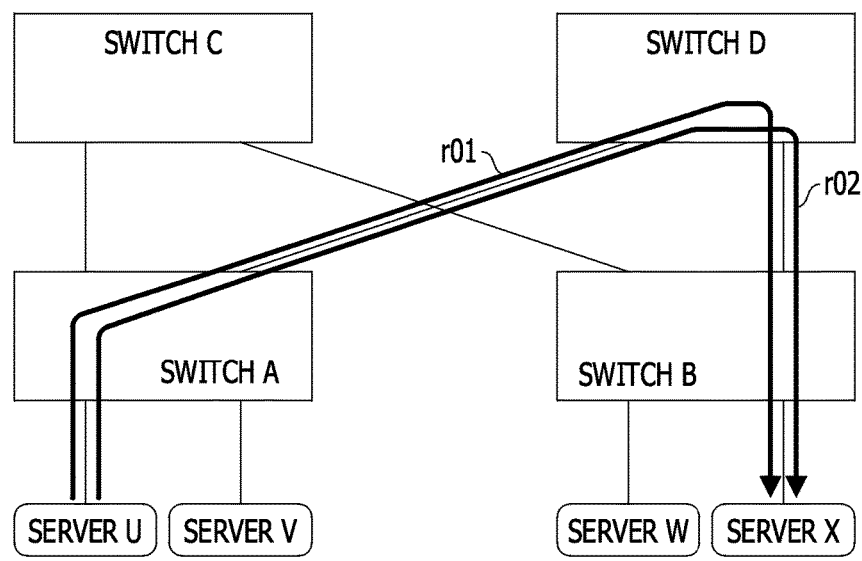
FIG. 2 is an explanatory diagram for describing the outline according to the first exemplary embodiment.

An outline according to the present exemplary embodiment will be described by using FIG. 1 to FIG. 4.

According to the present exemplary embodiment, a plurality of probe packets having different source port information are transferred between servers, and routes where the probe packets are transferred are recorded in the probe packets. More specifically, switches that relay the probe packets add identifiers of the switches (hereinafter, which will be referred to as a switch ID (Identifier)) to the probe packets. In an example of FIG. 1, a switch ID of a switch A, a switch ID of a switch C, and a switch ID of a switch B are added to the probe packets transferred on a route r01. The switch ID of the switch A, a switch ID of a switch D, and the switch ID of the switch B are added to the probe packets transferred on a route r02. In addition, a server X replies a response packet in which a transmission source address and a destination address of the received probe packet are swapped to a server U. The switch IDs of the switches on the route are added to the response packet. It is noted that a forward route and a backward route are not necessarily the same according to the first exemplary embodiment.

Then, the server U executes processing of analyzing route information added to the reply with regard to each response packet and identifies a correspondence relationship between the source port information and the route. For example, the correspondence relationship between the source port information and the route is identified in a manner that the route is the route r01 in a case where the source port information is "0x0001", the route is the route r02 in a case where the source port information is "0x0002", . . . .

Thereafter, the server U generates a probe packet in which the identified source port information is set in a header with regard to each route and transmits the generated probe packet. In this manner, when at least one probe packet is transmitted with regard to each route, the status of the route can be checked. That is, since processing of transmitting the probe packet is not performed while the source port information is changed (for example, while the source port number is sequentially changed from 0 to a predetermined value), it is possible to reduce the number of probe packets.

In a case where a communication abnormality occurs with regard to a certain route (for example, a case where no reply is issued with respect to the probe packet), in accordance with the correspondence relationship, the source port information of the packet transmitted through the route is changed. In an example of FIG. 2, since the communication abnormality is detected based on the probe packet transmitted with regard to the route r01, "0x0002" is set instead of "0x0001" in the header of the packet transmitted to the server X as the source port information. It is noted that the communication abnormality with regard to the route includes, for example, a coupling fault of a cable, a half dead state of an optical module, an intermittent fault due to a failure at a particular position in the memory, or the like.

In addition, in a case where the communication abnormality occurs with regard to a certain communication flow, the server U sets another piece of source port information in accordance with the correspondence relationship with regard to the flow, so that the packet in the flow passes through the other route. It is noted that the communication abnormality with regard to the communication flow includes, for example, a delay caused by a retransmission after the discard of the packet transmitted out from the application or the like.

Figure 3:
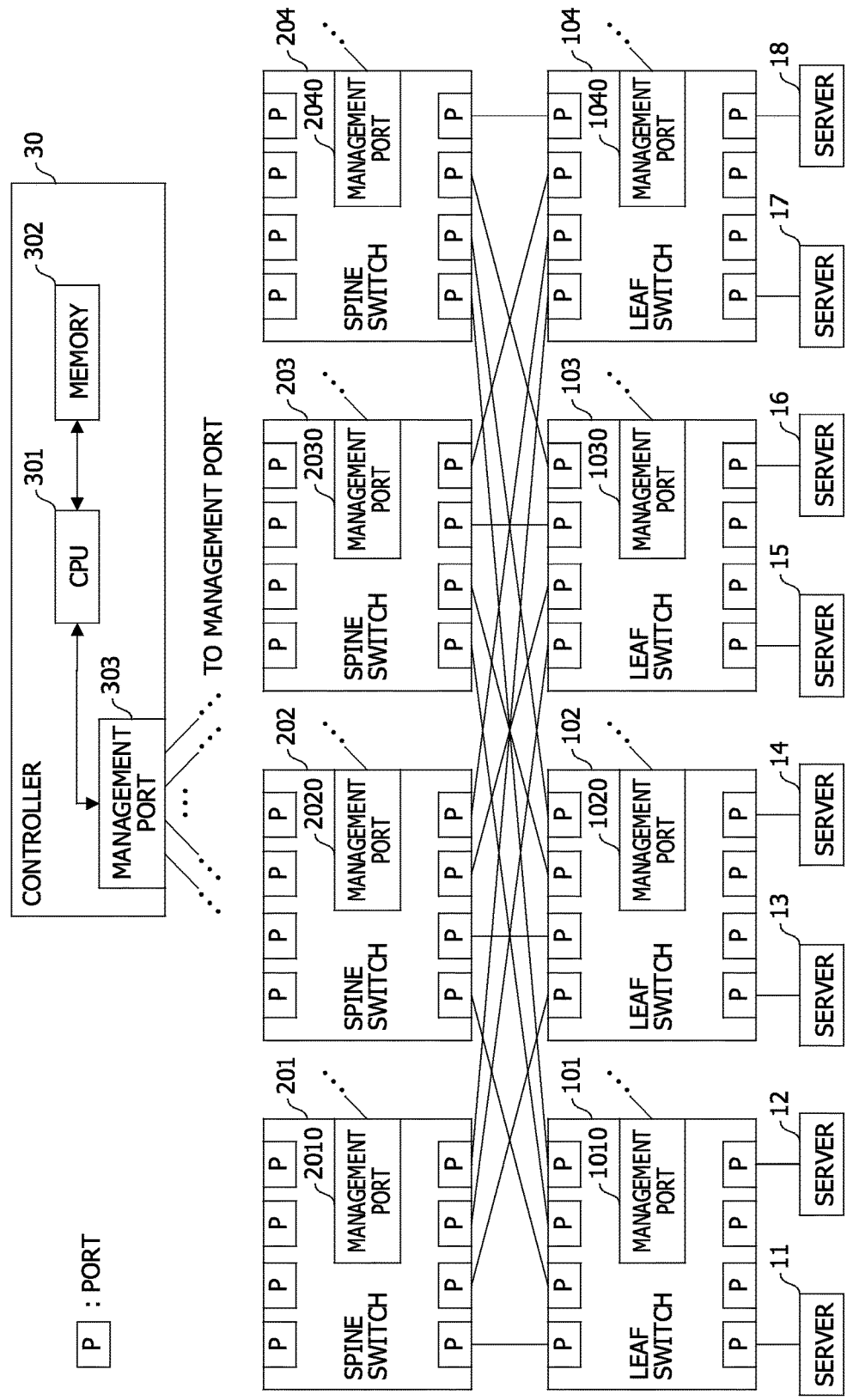
FIG. 3 illustrates a system outline according to the first exemplary embodiment.

Hereinafter, specific contents according to the present exemplary embodiment will be described. FIG. 3 illustrates a system outline according to the present exemplary embodiment. The system according to the present exemplary embodiment is structured, for example, in a data center. Servers 11 to 18 are physical servers and are coupled to leaf switches 101 to 104 corresponding to physical servers. Specifically, the server 11 and the server 12 are coupled to the leaf switch 101. The server 13 and the server 14 are coupled to the leaf switch 102. The server 15 and the server 16 are coupled to the leaf switch 103. The server 17 and the server 18 are coupled to the leaf switch 104. Each of the leaf switches 101 to 104 is coupled to spine switches 201 to 204 corresponding to physical servers. Each of the leaf switches 101 to 104 and the spine switches 201 to 204 is coupled, for example, to a controller 30 corresponding to a physical server.

The leaf switch 101 includes a plurality of ports and a management port 1010. The leaf switch 102 includes a plurality of ports and a management port 1020. The leaf switch 103 includes a plurality of ports and a management port 1030. The leaf switch 104 includes a plurality of ports and a management port 1040. The spine switch 201 includes a plurality of ports and a management port 2010. The spine switch 202 includes a plurality of ports and a management port 2020. The spine switch 203 includes a plurality of ports and a management port 2030. The spine switch 204 includes a plurality of ports and a management port 2040.

The controller 30 includes a CPU (Central Processing Unit) 301, a memory 302 corresponding to a main storage device, for example, and a management port 303. Although the controller 30 includes other hardware components, the components are not directly related to descriptions of the present exemplary embodiment, and descriptions of the components are omitted. A program for the controller 30 to execute the processing according to the present exemplary embodiment is loaded into the memory 302 and executed by the CPU 301. The management port 303 is coupled to the management port of each of the spine switches 201 to 204 and the leaf switches 101 to 104 via network cables, for example, and data for the management is transmitted and received.

An application of each tenant or the like is executed on the servers 11 to 18. Data output from the application of each tenant is transferred to an application program of the same tenant via the overlay network constituted on the leaf switches 101 to 104 and the spine switches 201 to 204. The overlay network according to the present exemplary embodiment is realized, for example, by VXLAN. The overlay network according to the present exemplary embodiment is a network where a plurality of routes that can be simultaneously used exist between the servers (that is, a network of a multipath configuration).

Figure 4:
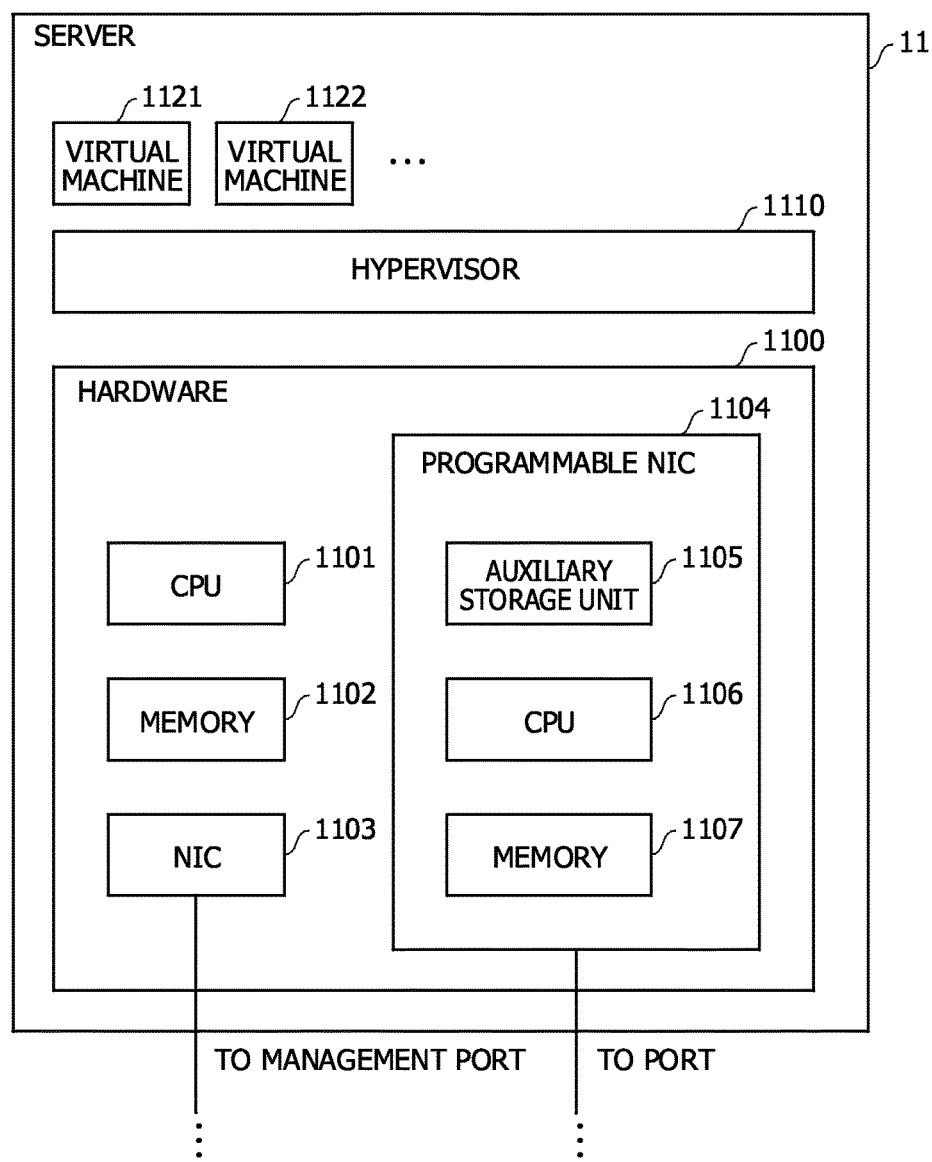
FIG. 4 is a block diagram of a server.

FIG. 4 is a block diagram of the server 11. The server 11 includes hardware 1100, a hypervisor 1110 realized on the hardware 1100, and virtual machines 1121 and 1122 realized on the hypervisor 1110. The hardware 1100 includes a CPU 1101, a memory 1102 corresponding to a main storage device, for example, a NIC (Network Interface Card) 1103, and a programmable NIC 1104. The virtual machines 1121 and 1122 execute the applications of the tenants.

The programmable NIC 1104 includes an auxiliary storage device 1105, a CPU 1106, and a memory 1107 corresponding to a main storage device, for example. A program for the hypervisor 1110 and programs for the virtual machines 1121 and 1122 are loaded into the memory 1102 and executed by the CPU 1101, so that the hypervisor 1110 and the virtual machines 1121 and 1122 are realized. It is noted that the number of virtual machines in an example of FIG. 4 is 2, but the number is not limited. In addition, it is set that the block configurations of the servers 12 to 18 are the same as the block configuration of the server 11.

Figure 5:
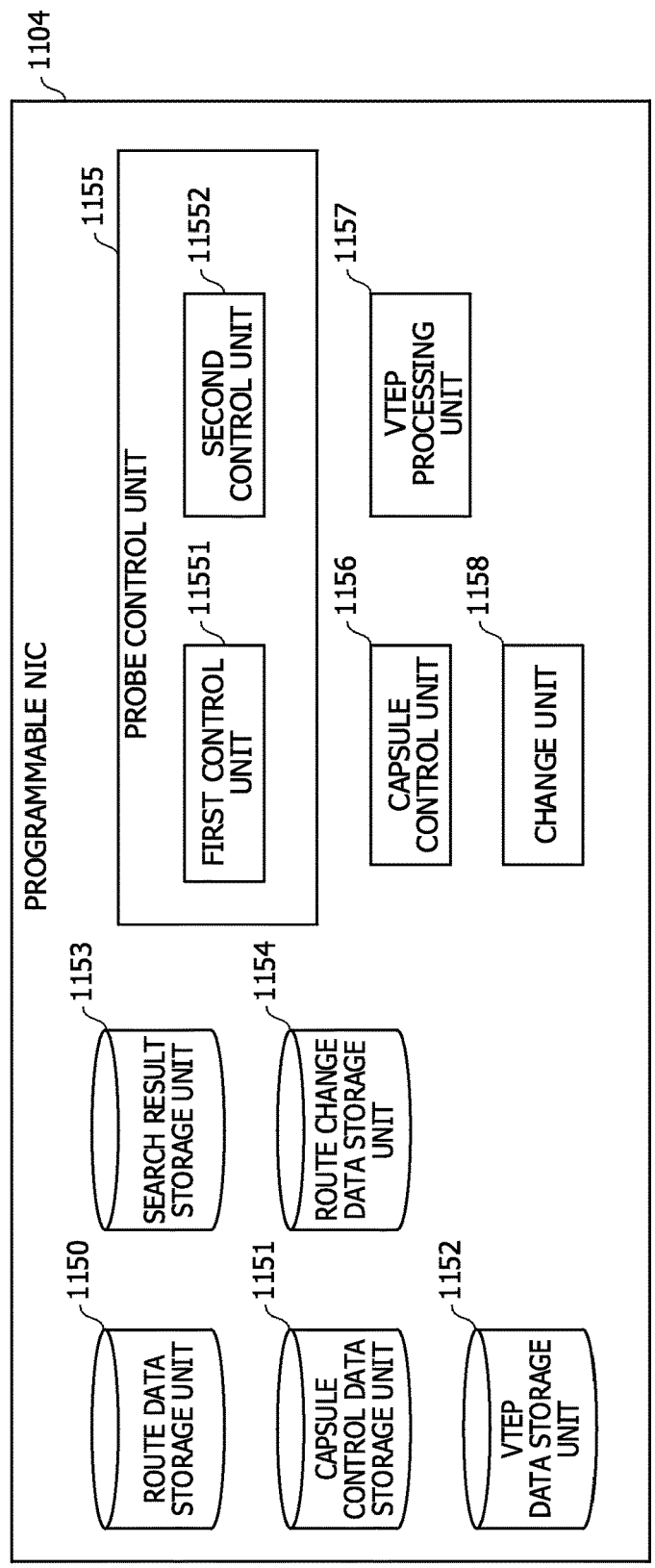
FIG. 5 is a functional block diagram of a programmable NIC.

FIG. 5 is a functional block diagram of the programmable NIC 1104. The programmable NIC 1104 includes a route data storage unit 1150, a capsule control data storage unit 1151, a VTEP (Virtual Tunnel End Point) data storage unit 1152, a search result storage unit 1153, a route change data storage unit 1154, a probe control unit 1155, a capsule control unit 1156, a VTEP processing unit 1157, and a change unit 1158. The probe control unit 1155 includes a first control unit 11551 and a second control unit 11552. A program for executing the processing according to the present exemplary embodiment is stored, for example, in the auxiliary storage device 1105 and loaded into the memory 1107 to be executed by the CPU 1106, so that the first control unit 11551, the second control unit 11552, the capsule control unit 1156, the VTEP processing unit 1157, and the change unit 1158 in FIG. 5 are realized. The route data storage unit 1150, the capsule control data storage unit 1151, the VTEP data storage unit 1152, the search result storage unit 1153, and the route change data storage unit 1154 in FIG. 5 are provided to the memory 1107 or the auxiliary storage device 1105.

The first control unit 11551 executes processing of transmitting the plurality of probe packets having different source port information to a destination server. The second control unit 11552 executes processing of periodically transmitting the probe packet to the destination server in accordance with a result of the processing by the capsule control unit 1156. The capsule control unit 1156 executes processing of managing encapsulation and decapsulation by the VTEP processing unit 1157. The VTEP processing unit 1157 executes the encapsulation and the decapsulation of the packet. The change unit 1158 executes processing of changing the routes when the communication abnormality occurs.

Figure 6:
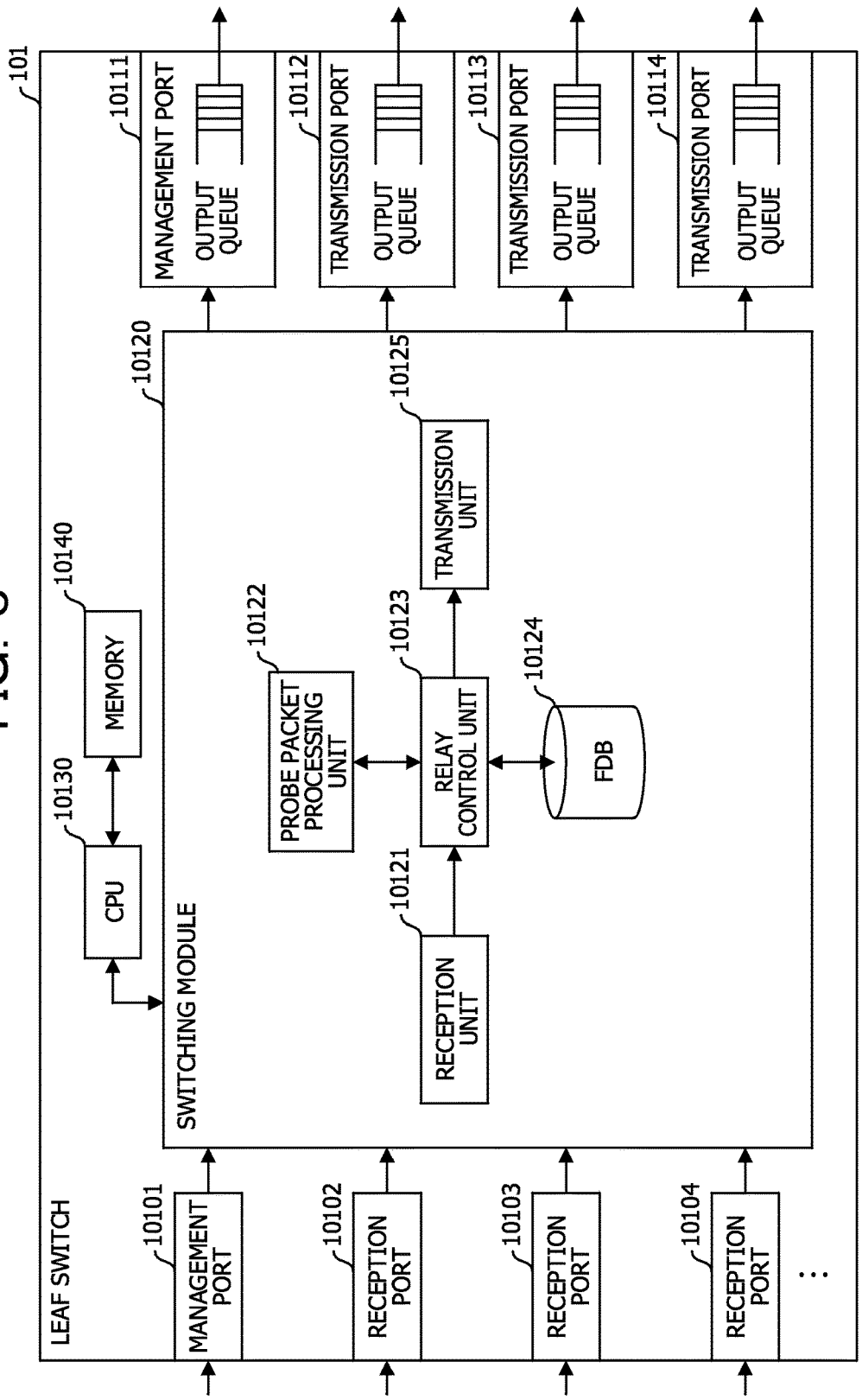
FIG. 6 is a functional block diagram of a switch.

FIG. 6 is a block diagram of the leaf switch 101. The leaf switch 101 includes a management port 10101, reception ports 10102 to 10104, a management port 10111, transmission ports 10112 to 10114 including output queues, a switching module 10120, a CPU 10130, and a memory 10140 corresponding to a main storage device, for example. The switching module 10120 includes a reception unit 10121, a probe packet processing unit 10122, a relay control unit 10123, a FDB (Forwarding DataBase) 10124, and a transmission unit 10125. It is noted that the number of reception ports and the number of transmission ports in FIG. 6 are 3, but the numbers are not limited. In addition, the block diagrams of the leaf switches 102 to 104 and the spine switches 201 to 204 is the same as the block diagram of the leaf switch 101.

The reception unit 10121 passes over the packet received from one of the reception ports 10102 to 10104 to the relay control unit 10123. The relay control unit 10123 determines whether or not the packet received from the reception unit 10121 is the probe packet, and in a case where the packet received from the reception unit 10121 is the probe packet, the switch ID of its own switch is added to the probe packet processing unit 10122. Then, the relay control unit 10123 determines the transmission port at the output destination of the packet based on the data stored in the FDB 10124 and passes over information of the transmission port at the output destination of the packet and the packet to the transmission unit 10125. The transmission unit 10125 outputs the packet to one of the transmission ports 10112 to 10114 in accordance with the information of the transmission port at the output destination of the packet.

Figure 7:
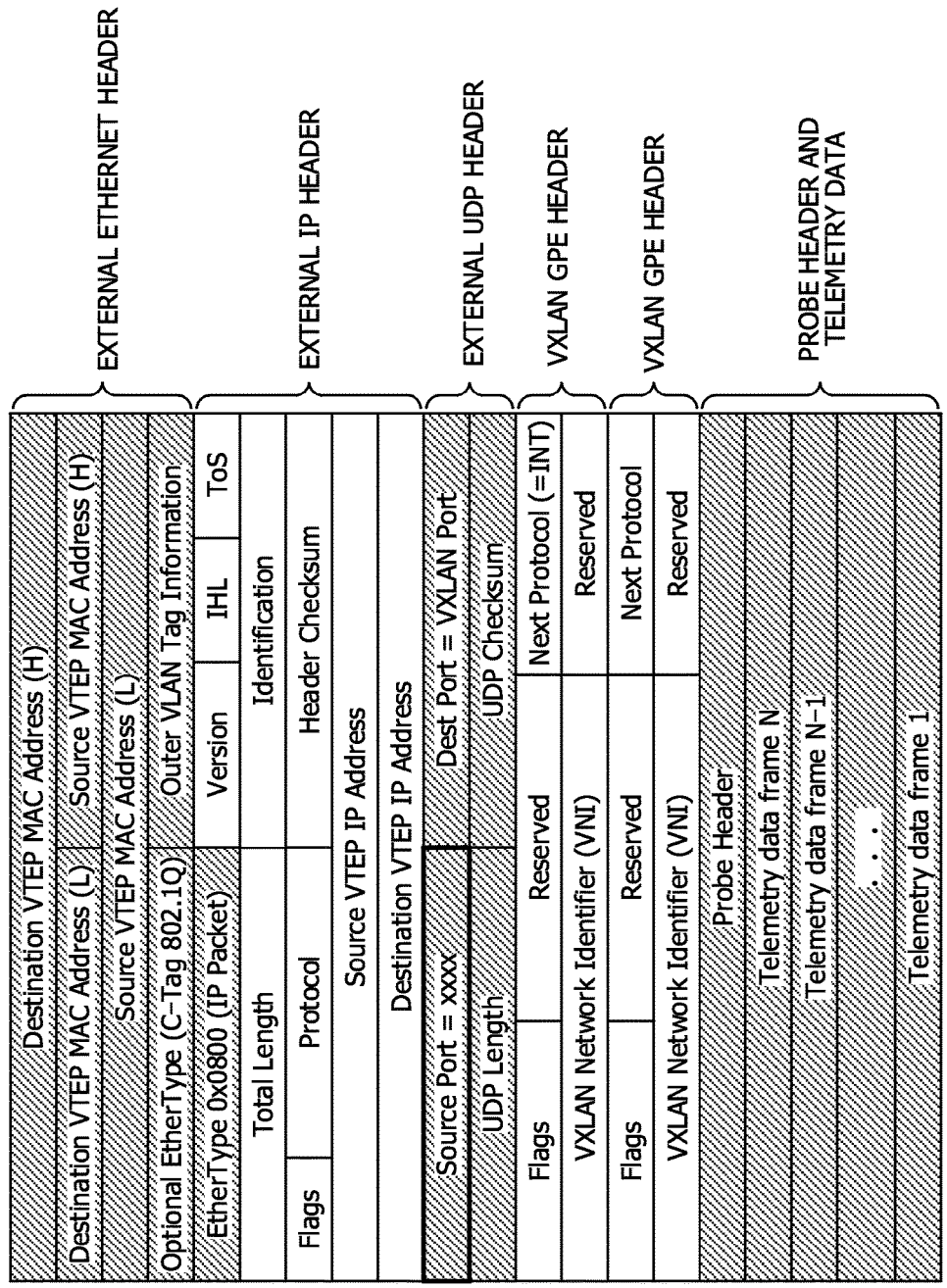
FIG. 7 illustrates an example of a format of a probe packet.

FIG. 7 illustrates an example of the format of the probe packet according to the present exemplary embodiment. The probe packet according to the present exemplary embodiment includes an external Ethernet (registered trademark) header, an external IP (Internet Protocol) header, an external UDP (User Datagram Protocol) header, a first VXLAN GPE (Generic Protocol Extension) header, a second VXLAN GPE header, and a probe header and telemetry data. "INT" refers to Inband Network Telemetry disclosed in "In-band Network Telemetry (INT)". Data stored in a field assigned with (L) follows data stored in a field assigned with (H). The source port information is stored in a field surrounded by a bold line, and the source port information is rewritten by the VTEP processing unit 1157.

Figure 8:
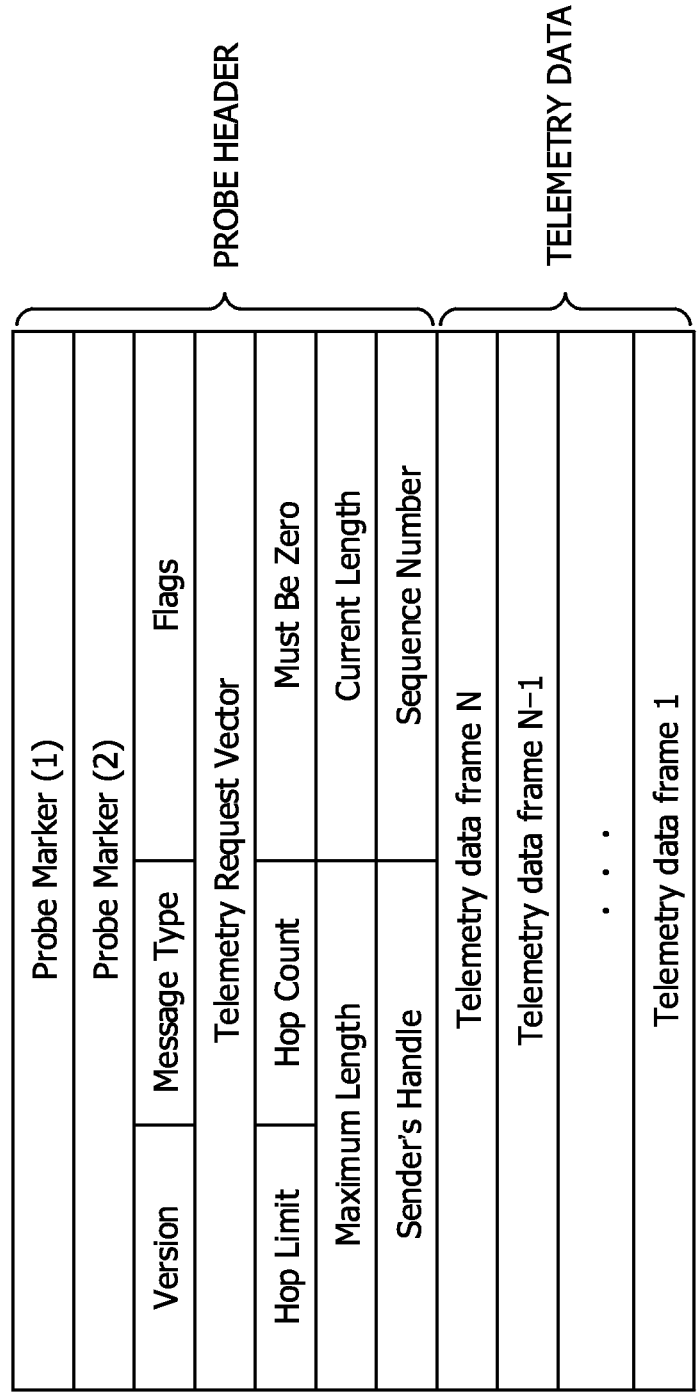
FIG. 8 illustrates examples of formats of a probe header and telemetry data.

FIG. 8 illustrates examples of formats of the probe header and the telemetry data in FIG. 7. A "Probe Maker" field is an identification field of the probe packet. For example, in a case where the "Probe Maker" field is "0xDEADBEAF" in a UDP packet in which a "Next Protocol" field the VXLAN GPE header is "INT", it is determined that the packet is determined as the probe packet. It is noted however that the identification may also be performed based on a VLAN (Virtual Local Area Network) tag added to an external header. "Telemetry Request Vector" represents a type of information requested by telemetry, and a bit for requesting a device ID (that is, a switch ID) is set as on according to the present exemplary embodiment.

Figure 9:
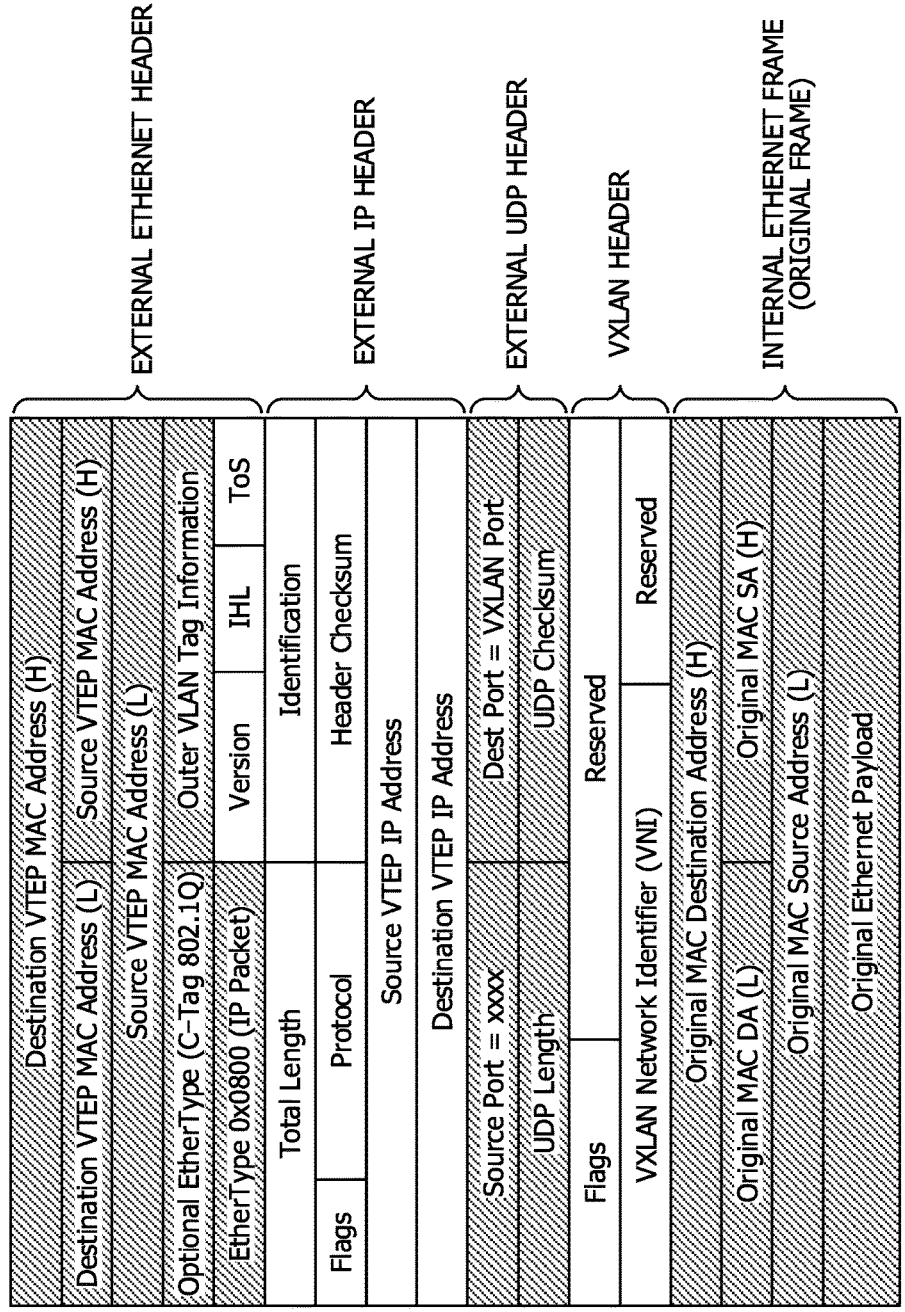
FIG. 9 illustrates an example of a format of a packet that is not the probe packet.

FIG. 9 illustrates an example of a format of a packet that is not the probe packet (that is, a normal packet). The packet includes the external Ethernet header, the external IP header, the external UDP header, the VXLAN header, and an internal Ethernet frame (that is, an original frame). The source port information is rewritten by the VTEP processing unit 1157 in the normal packet too. The header of the internal Ethernet frame is not changed since the header is used by the application.

A result obtained by performing the hash calculation with respect to the information included in the internal Ethernet frame header is set in the source port information field of the external UDP header in a normal VXLAN, and the transfer route of the packet is determined based on the source port information. However, according to the present exemplary embodiment, a value is set in the source port information field of the external UDP header in accordance with the correspondence relationship identified by the analysis.

Next, processing executed in the system according to the first exemplary embodiment will be described by using FIG. 10 to FIG. 23. First, processing executed by the controller 30 according to the first exemplary embodiment will be described by using FIG. 10.

Figure 10:
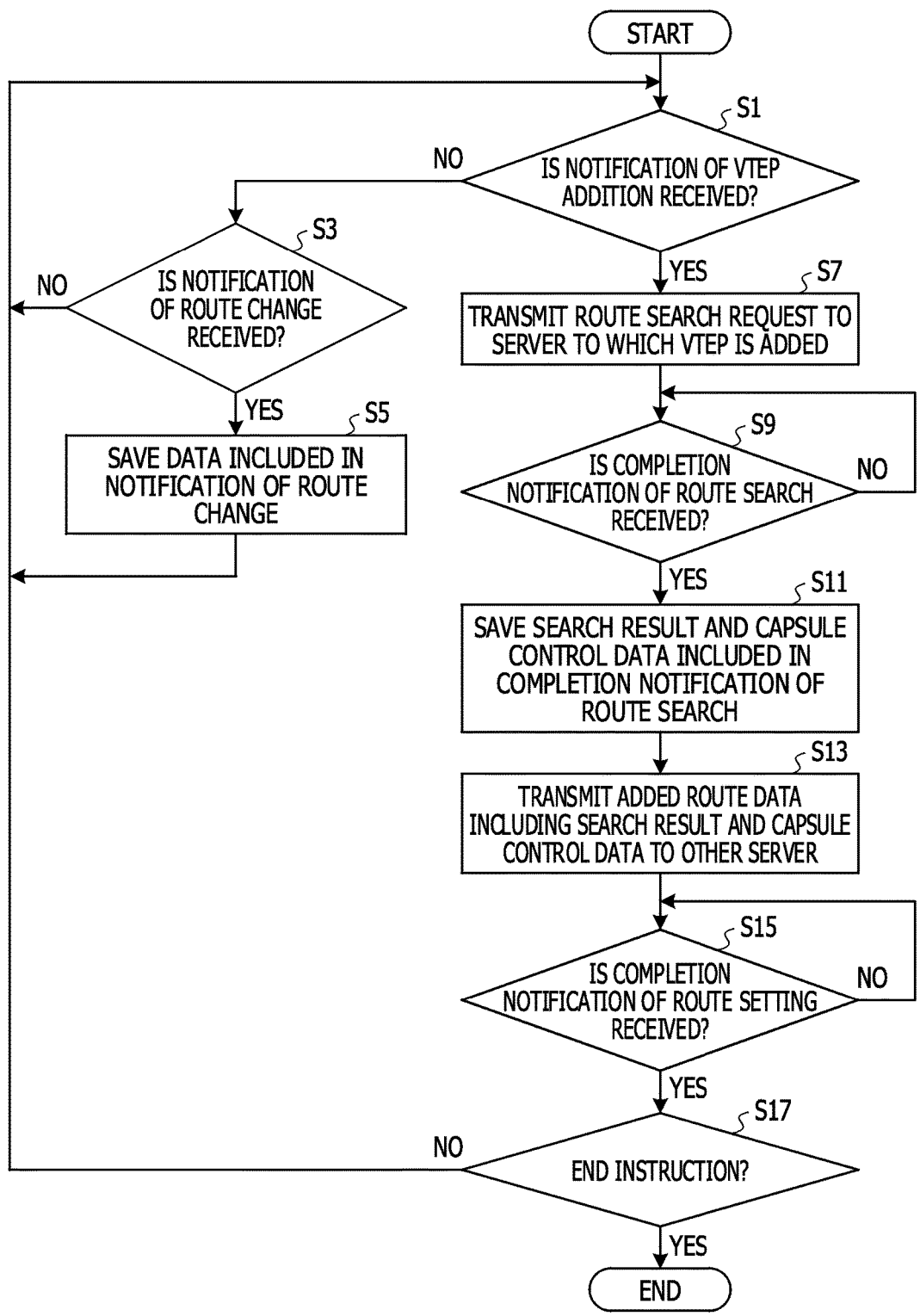
FIG. 10 illustrates a processing flow of processing executed by a controller according to the first exemplary embodiment.

First, the controller 30 determines whether or not the notification indicating that the VTEP processing unit 1157 is added is received from one server among the servers 11 to 18 (FIG. 10: step S1). When the VTEP processing unit 1157 is added to the server, the communication based on the application executed by the virtual machine on the server, and therefore the setting of the route is to be performed. This notification includes an identifier of the added VTEP processing unit 1157.

In a case where the notification indicating that the VTEP processing unit 1157 is added is not received from any server (step S1: No route), the controller 30 determines whether or not a notification of a route change is received (step S3). The notification of the route change will be described below.

In a case where the notification of the route change is not received (step S3: No route), the processing returns to step S1. On the other hand, in a case where the notification of the route change is received (step S3: Yes route), the controller 30 saves data included in the notification of the route change (step S5). Then, the processing returns to step S1. It is noted that the data included in the notification of the route change is data generated in each server, but the controller 30 also manages the data such that the controller 30 can manage the entire network. It is noted however that the data managed by the controller 30 is not directly related to the processing according to the present exemplary embodiment.

On the other hand, in a case where the notification indicating that the VTEP processing unit 1157 is added is received from one of the servers (step S1: Yes route), the controller 30 transmits a route search request to the server to which the VTEP processing unit 1157 is added (step S7). The route search request includes an identifier of the added VTEP processing unit 1157.

The controller 30 determines whether or not a completion notification of the route search is received from the server at the transmission destination of the route search request (step S9). In a case where the completion notification of the route search is not received (step S9: No route), the processing returns to step S9.

On the other hand, in a case where the completion notification of the route search is received (step S9: Yes route), the controller 30 executes the following processing. Specifically, the controller 30 saves a search result and capsule control data included in the completion notification of the route search (step S11). It is noted that the search result and the capsule control data are data generated in each server, but the controller 30 also manages the data such that the controller 30 can manage the entire network. It is noted however that the search result and the capsule control data managed by the controller 30 are not directly related to the processing according to the present exemplary embodiment.

The controller 30 generates added route data including the search result and the capsule control data and transmits the added route data to the server where there is a possibility for performing the communication with the server to which the VTEP processing unit 1157 is added (step S13). Since the communication between the virtual machines of the same tenant is performed in the data center, in step S13, the added route data is transmitted to the server that executes the virtual machines of the same tenant.

The controller 30 determines whether or not a completion notification of the route setting is received from the server at the transmission destination of the added route data (step S15). Since the completion notification of the route setting includes an entry of the capsule control data storage unit 1151, the controller 30 saves the entry.

In a case where the completion notification of the route setting is not received (step S15: No route), the processing returns to step S15.

On the other hand, in a case where the completion notification of the route setting is received (step S15: Yes route), the controller 30 determines whether or not an end instruction (for example, a shutdown instruction) is accepted (step S17). In a case where the end instruction is not accepted (step S17: No route), the processing returns to step S1. On the other hand, in a case where the end instruction is accepted (step S17: Yes route), the processing is ended.

Next, the processing executed by the server 11 will be described by using FIG. 11 to FIG. 22. It is noted that the processing executed by the server 11 will be described herein as an example, but the processing executed by the servers 12 to 18 is also similar to the processing executed by the server 11.

Figure 11:
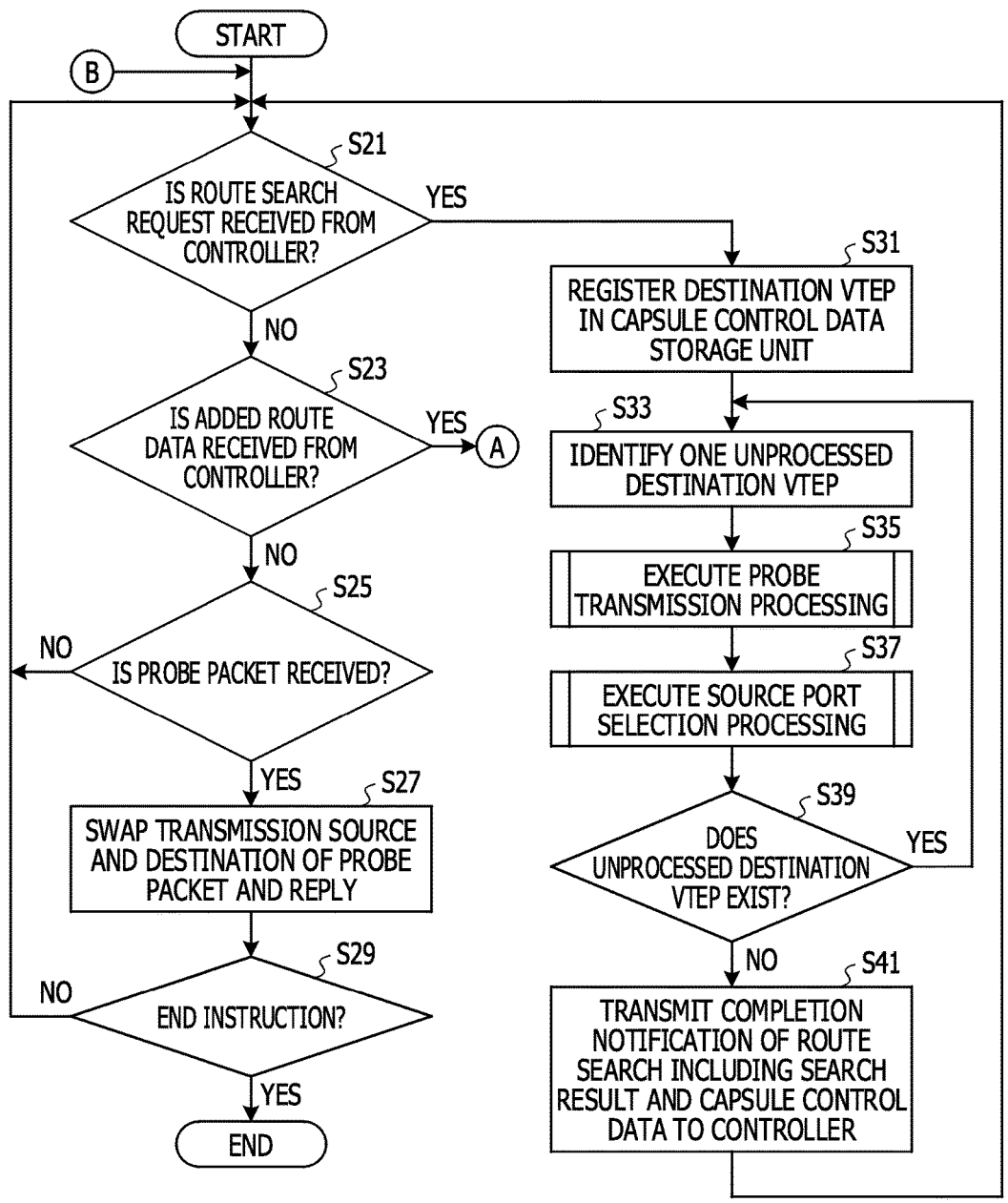
FIG. 11 illustrates a processing flow of processing executed by a server according to the first exemplary embodiment.

First, the capsule control unit 1156 determines whether or not the route search request is received from the controller 30 (FIG. 11: step S21). In a case where the route search request is received from the controller 30 (step S21: Yes route), the capsule control unit 1156 stores an identifier or the like of the VTEP processing unit 1157 of the destination server (hereinafter, which will be referred to as a destination VTEP) in the capsule control data storage unit 1151 (step S31). It is noted that a plurality of identifiers are stored in the capsule control data storage unit 1151 in a case where the number of destination VTEPs is plural.

FIG. 12 illustrates an example of the capsule control data stored in the capsule control data storage unit 1151 according to the first exemplary embodiment. In an example of FIG. 12, a transmission source MAC address included in the internal header of the packet, a destination MAC address included in the internal header of the packet, an identifier of the destination VTEP, and the source port information set in the external header of the packet are stored. It is noted however that the source port information is not stored at the time of the processing in step S31.

In addition, the servers 11 to 18 manage VTEP data as illustrated in FIG. 13 in the VTEP data storage unit 1152. Since the route search request includes the identifier of the destination VTEP, in step S31, the MAC address corresponding to the destination VTEP is identified based on the VTEP data and stored in the capsule control data storage unit 1151. Furthermore, the transmission source MAC address is also stored in the capsule control data storage unit 1151.

The capsule control unit 1156 identifies one unprocessed destination VTEP from the capsule control data storage unit 1151 (step S33).

Then, the first control unit 11551 in the probe control unit 1155 executes probe transmission processing (step S35). The probe transmission processing will be described by using FIG. 14 to FIG. 16.

Figure 14:
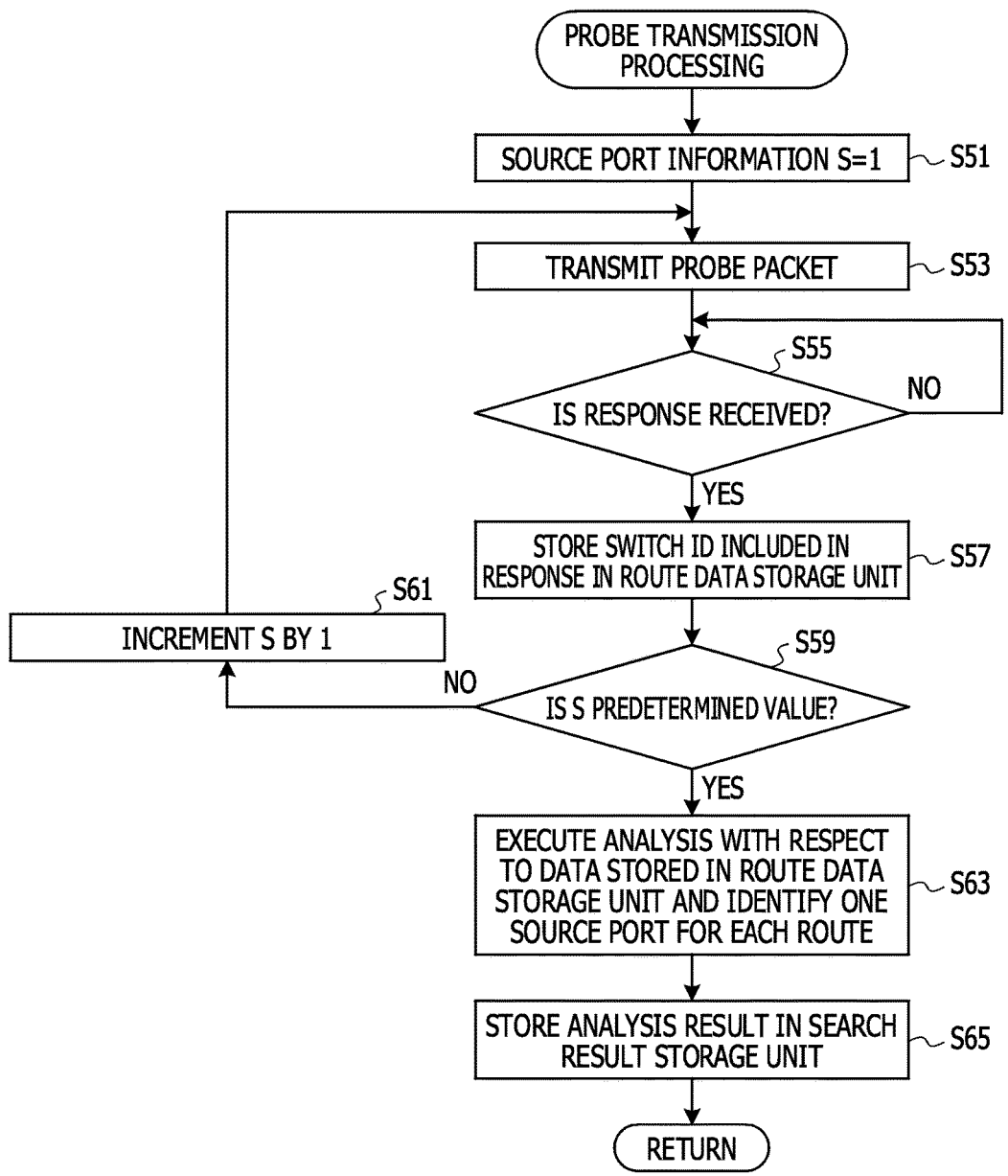
FIG. 14 illustrates a processing flow of probe transmission processing.

First, the first control unit 11551 sets 1 in source port information S (FIG. 14: step S51).

The first control unit 11551 sets S in the source port information in the external header of the probe packet and transmits the probe packet after the setting to the server including the destination VTEP (step S53). It is noted that the encapsulation of the probe packet is performed by the VTEP processing unit 1157.

The first control unit 11551 determines whether or not a response transmitted in step S53 with respect to the probe packet is received (step S55). In a case where the response is not received (step S55: No route), the processing returns to step S55.

On the other hand, in a case where the response is received (step S55: Yes route), the first control unit 11551 stores the switch ID included in the received response in the route data storage unit 1150 (step S57).

FIG. 15 illustrates an example of route data stored in the route data storage unit 1150. In an example of FIG. 15, the source port information and the switch ID of the switch on the route in a case where the source port information is set are stored with regard to the forward route and the backward route. For example, in a case where the server 11 sets the source port information "0x0001" and transmits the probe packet, the probe packet is transferred on a route passing through the spine switch 201. It is noted that the switch ID of the leaf switch is omitted in FIG. 15 since a leaf switch through which the route passes is identified. Since the server that has received the probe packet replies a packet in which the transmission source MAC address and the destination MAC address of the probe packet are swapped, the source port information with regard to the backward route is the same as the source port information "0x0001" with regard to the forward route. Therefore, the forward route is a route passing through the spine switch 202.

The first control unit 11551 determines whether or not the source port information S is a predetermined value (for example, 64000) (step S59). In a case where the source port information S is not the predetermined value (step S59: No route), the first control unit 11551 increments the source port information S by 1 (step S61). Then, the processing returns to step S53.

On the other hand, in a case where the source port information S is the predetermined value (step S59: Yes route), the first control unit 11551 causes the capsule control unit 1156 to execute the following processing. Specifically, the capsule control unit 1156 performs an analysis with respect to the data stored in the route data storage unit 1150 and identifies one source port with regard to each route (step S63). Then, the capsule control unit 1156 stores an analysis result in step S63 in the search result storage unit 1153 (step S65). Then, the processing returns to the invoker.

FIG. 16 illustrates an example of the data stored in the search result storage unit 1153. In an example of FIG. 16, the switch ID and the source port information of the spine switch through which the forward route passes and the switch ID and the source port information of the spine switch through which the backward route passes are stored with regard to a certain destination VTEP.

Descriptions return to the explanation on FIG. 11, and the capsule control unit 1156 executes source port selection processing (step S37). The source port selection processing will be described by using FIG. 17.

Figure 17:
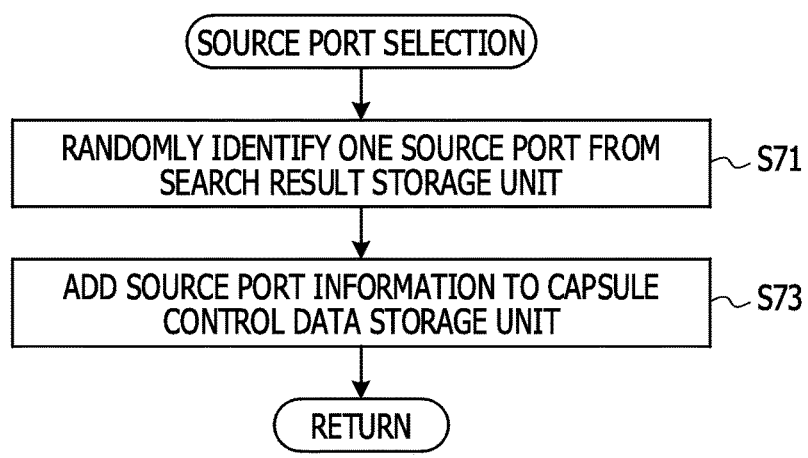
FIG. 17 illustrates a processing flow of source port selection processing.

First, the capsule control unit 1156 randomly identifies one source port from among the source ports storing the source port information stored in the search result storage unit 1153 (FIG. 17: step S71).

The capsule control unit 1156 adds the source port information of the source port identified in step S71 to the capsule control data storage unit 1151 (step S73). Since the source port information is not stored in step S31, the source port information is added to the entry added in step S31. Then, the processing returns to the invoker.

Descriptions return to the explanation on FIG. 11, and the capsule control unit 1156 determines whether or not an unprocessed destination VTEP exists (step S39). In a case where the unprocessed destination VTEP exists (step S39: Yes route), the processing returns to step S33. On the other hand, in a case where the unprocessed destination VTEP does not exist (step S39: No route), the capsule control unit 1156 executes the following processing. Specifically, the capsule control unit 1156 transmits the completion notification of the route search including the search result and the capsule control data to the controller 30 (step S41). Then, the processing returns to step S21.

On the other hand, in a case where the route search request is not received from the controller 30 (step S21: No route), the capsule control unit 1156 determines whether or not the added route data is received from the controller 30 (that is, its own server is the destination server) (step S23).

In a case where the added route data is received from the controller 30 (step S23: Yes route), the processing shifts to step S43 of FIG. 18 via a terminal A.

Figure 18:
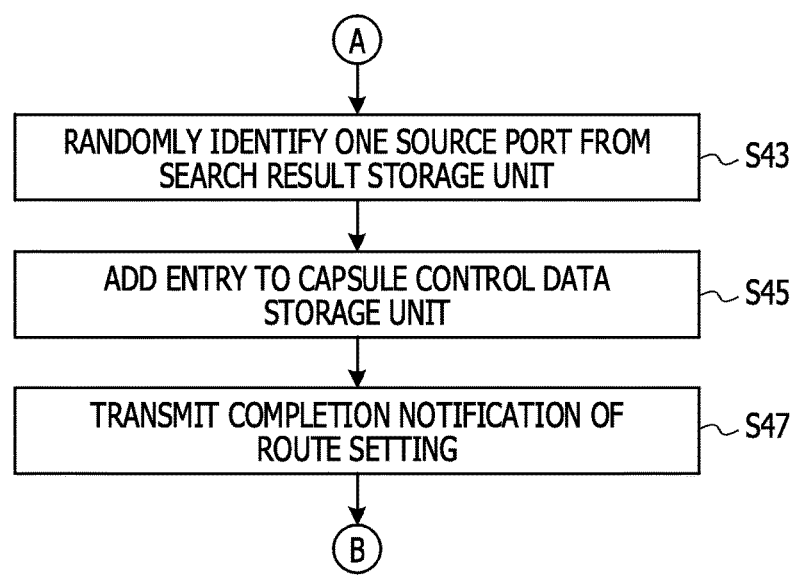
FIG. 18 illustrates a processing flow of the processing executed by the server.

Descriptions shift to the explanation on FIG. 18, and the capsule control unit 1156 randomly identifies one source port from among the source ports where the source port information is stored in the search result storage unit 1153 (FIG. 18: step S43).

The capsule control unit 1156 generates an entry based on the data included in the received added route data and the source port information of the source port identified in step S43 and adds the generated entry to the capsule control data storage unit 1151 (step S45). As described above, since the added route data includes the capsule control data of the server of the communication partner, the destination MAC address and the transmission source MAC address are swapped in the capsule control data. In addition, the identifier of the added VTEP processing unit 1157 is set as the destination VTEP. Furthermore, the source port information of the source port identified in step S43 is set.

The capsule control unit 1156 transmits the completion notification of the route setting including the entry added in step S45 to the controller 30 (step S47). The processing returns to step S21 of FIG. 11 via a terminal B.

Descriptions return to the explanation on FIG. 11, and, in a case where the added route data is not received from the controller 30 (step S23: No route), the capsule control unit 1156 determines whether or not the probe packet is received (step S25).

In a case where the probe packet is not received (step S25: No route), the processing returns to step S21. On the other hand, in a case where the probe packet is received (step S25: Yes route), the first control unit 11551 transmits the packet in which the transmission source and the destination of the received probe packet are swapped to the transmission source of the probe packet (step S27).

The capsule control unit 1156 determines whether or not the end instruction is accepted (step S29). In a case where the end instruction is not accepted (step S29: No route), the processing returns to step S21. On the other hand, in a case where the end instruction is accepted (step S29: Yes route), the processing is ended.

When the above-described processing is executed, it is possible to generate the data indicating the correspondence relationship between the route and the source port information.

Figure 19:
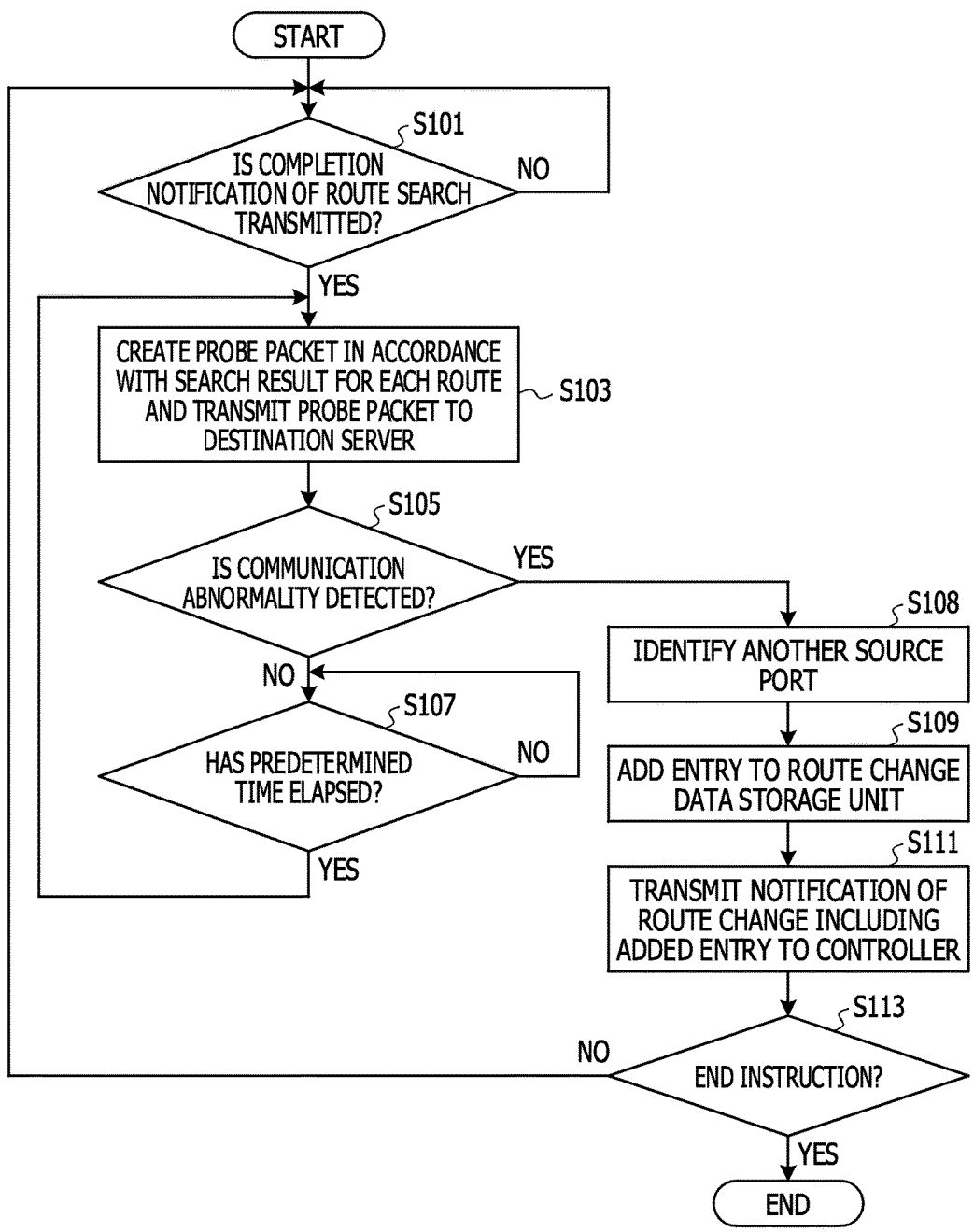
FIG. 19 illustrates a processing flow of processing of monitoring statuses of respective routes during an operation.

Processing of detecting the communication abnormality will be described by using FIG. 19 to FIG. 23. First, the change unit 1158 of the server 11 determines whether or not the completion notification of the route search is transmitted (FIG. 19: step S101). In a case where the completion notification of the route search is not transmitted (step S101: No route), the processing returns to step S101.

On the other hand, in a case where the completion notification of the route search is transmitted (step S101: Yes route), the change unit 1158 causes the second control unit 11552 of the probe control unit 1155 to execute the following processing. Specifically, the second control unit 11552 generates the probe packet in accordance with the search result stored in the search result storage unit 1153 with regard to each route and transmits the generated probe packet to the destination server (step S103). According to the present exemplary embodiment, since one source port is identified with regard to each route, the single probe packet is transmitted from each route to the destination server. It is noted that, in a case where the number of the destination servers is plural, the second control unit 11552 executes the processing with regard to each destination server by using the search result with regard to each of the destination servers. It is noted that the encapsulation of the probe packet is performed by the VTEP processing unit 1157.

The change unit 1158 determines whether or not the communication abnormality is detected (step S105). For example, in a case where a response with respect to the probe packet transmitted with regard to a certain route is not received, it is determined that the communication abnormality occurs in the route.

In a case where the communication abnormality is not detected (step S105: No route), the change unit 1158 determines whether or not a predetermined time has elapsed since the probe packet is transmitted in step S103 (step S107).

In a case where the predetermined time has not elapsed (step S107: No route), the processing returns to step S107. On the other hand, in a case where the predetermined time has elapsed (step S107: Yes route), the processing returns to step S103.

On the other hand, in a case where the communication abnormality is detected (step S105: Yes route), the change unit 1158 identifies one piece of source port information that is different from the source port information corresponding to the route where is the communication abnormality detected from the search result storage unit 1153 (step S108).

The change unit 1158 adds an entry including the source port information before the change, the source port information identified in step S108, and the identifier of the destination VTEP to the route change data storage unit 1154 (step S109).

FIG. 20 illustrates an example of data stored in the route change data storage unit 1154. In an example of FIG. 20, the identifier of the destination VTEP, the source port information before the change, and the source port information after the change are stored.

In addition, the change unit 1158 transmits the notification of the route change including the entry added in step S109 to the controller 30 (step S111).

The change unit 1158 determines whether or not the end instruction is accepted (step S113). In a case where the end instruction is not accepted (step S113: No route), the processing returns to step S101. On the other hand, in a case where the end instruction is accepted (step S113: Yes route), the processing is ended.

When the above-described processing is executed, it is possible to reduce the number of probe packets for checking the statuses of the routes. In addition, in a case where the abnormality of the communication route occurs in the communication between the servers, it is possible to collectively change the routes.

Figure 21:
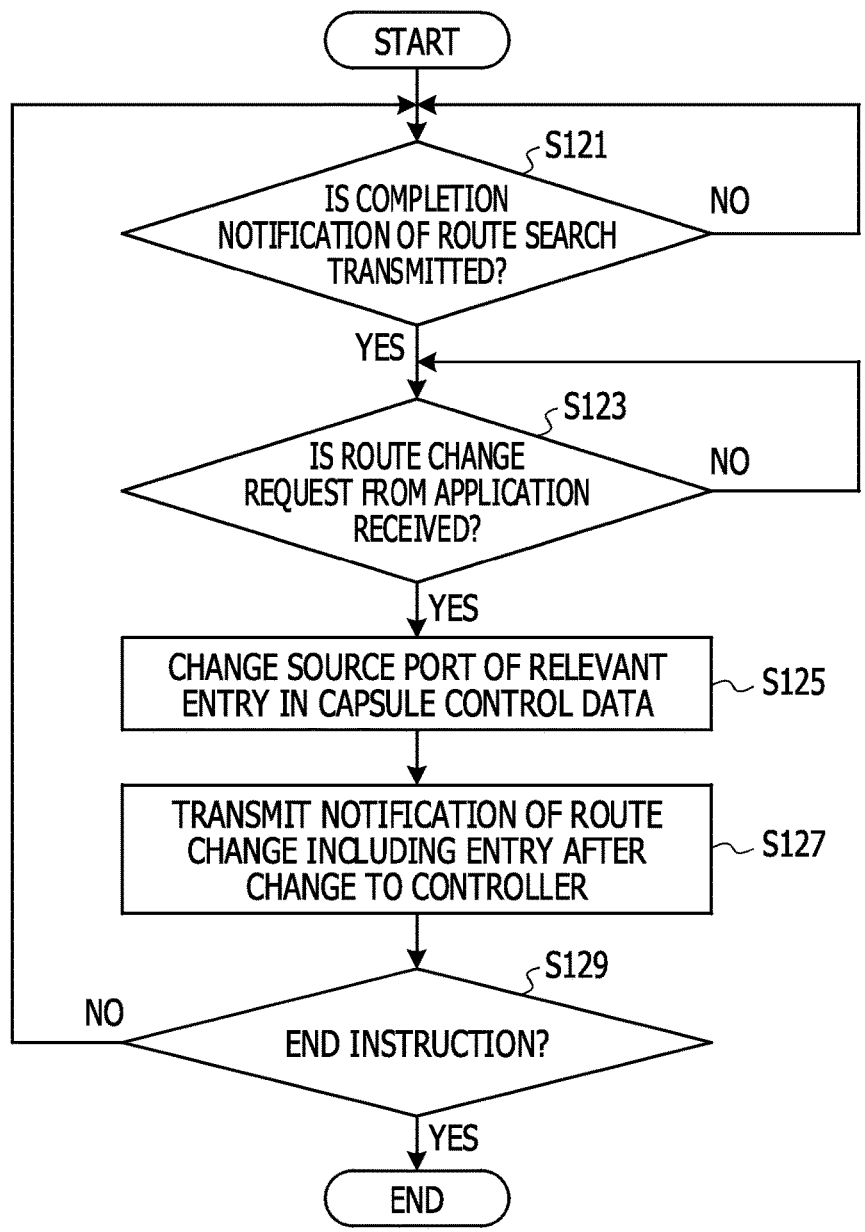
FIG. 21 illustrates a processing flow of the processing of monitoring the statuses of the respective routes during the operation.

In addition, the change unit 1158 also executes the following processing during the operation. First, the change unit 1158 determines whether or not the completion notification of the route search is transmitted (FIG. 21: step S121).

In a case where the completion notification of the route search is not transmitted (step S121: No route), the processing returns to step S121.

On the other hand, in a case where the completion notification of the route search is transmitted (step S121: Yes route), the change unit 1158 determines whether or not a route change request is received from the application executed by the virtual machine (step S123). For example, in a case where the application detects a delay, the route change request is output to the change unit 1158.

In a case where the route change request from the application is not received (step S123: No route), the processing returns to step S123. On the other hand, in a case where the route change request from the application is received (step S123: Yes route), the change unit 1158 executes the following processing. Specifically, the change unit 1158 changes the source port information included in the entry with regard to the communication flow which is stored in the capsule control data storage unit 1151 and also requested for a change to the other source port information identified from the search result storage unit 1153 (step S125).

The change unit 1158 transmits the notification of the route change including the entry after the change to the controller 30 (step S127).

The change unit 1158 determines whether or not the end instruction is accepted (step S129). In a case where the end instruction is not accepted (step S129: No route), the processing returns to step S121. On the other hand, in a case where the end instruction is accepted (step S129: Yes route), the processing is ended.

Figure 22:
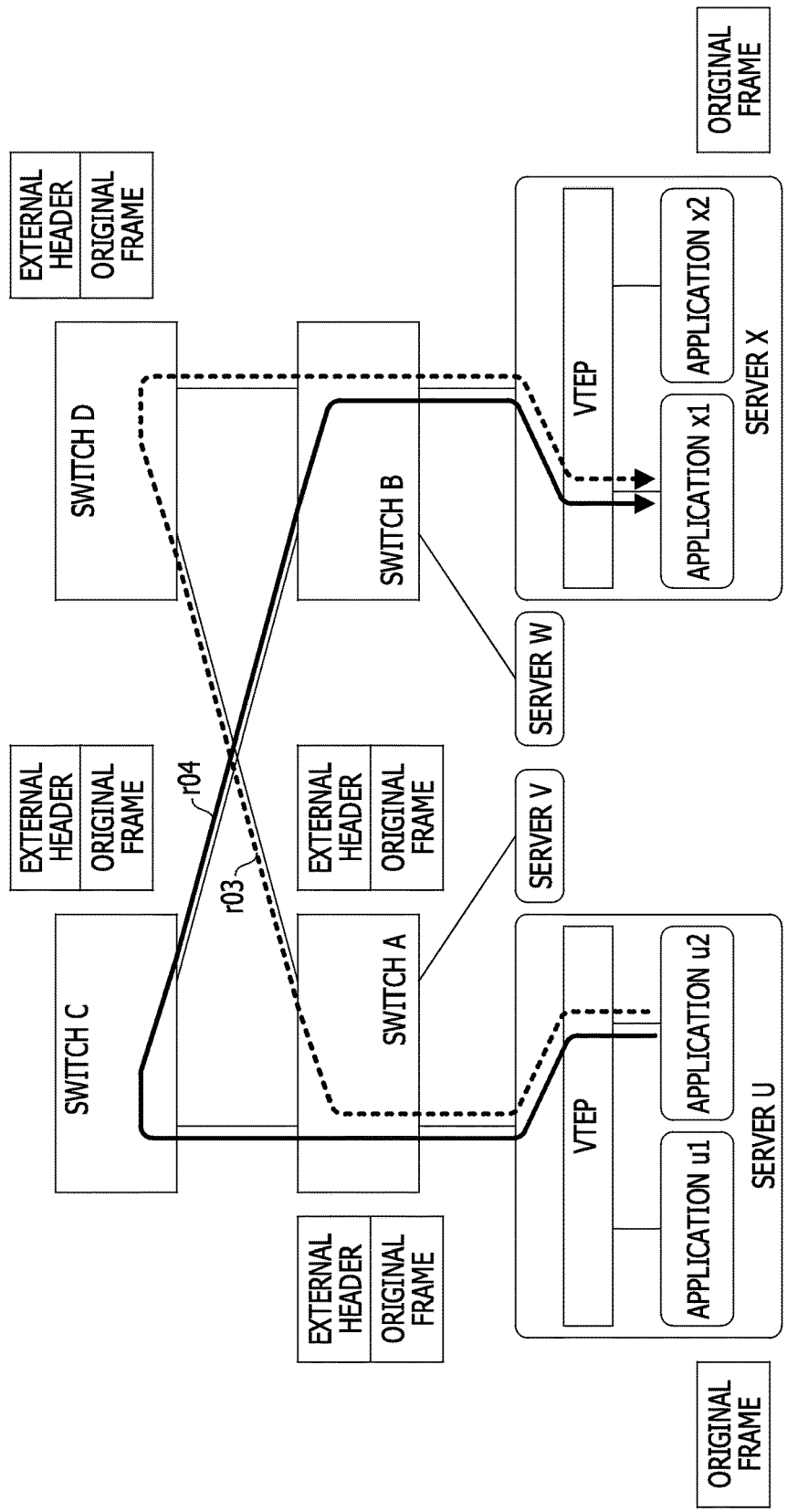
FIG. 22 is an explanatory diagram for describing a route change.

When the above-described processing is executed, in a case where the communication abnormality occurs with regard to a certain communication flow, it is possible to change the route with regard to only the communication flow. For example, as illustrated in FIG. 22, it is assumed that the communication abnormality is detected when a communication between an application u2 and an application x1 is performed by using a route r03. In this case, the capsule control data is updated such that the communication is performed by using a route r04 corresponding to a different route. At this time, the route is not changed with regard to the other communication flow.

Next, processing executed by the leaf switch 101 will be described by using FIG. 23. It is noted that the processing by the leaf switch 101 will be described as an example herein, but the processing executed by the leaf switches 102 to 104 and the spine switches 201 to 204 is similar to the processing executed by the leaf switch 101.

Figure 23:
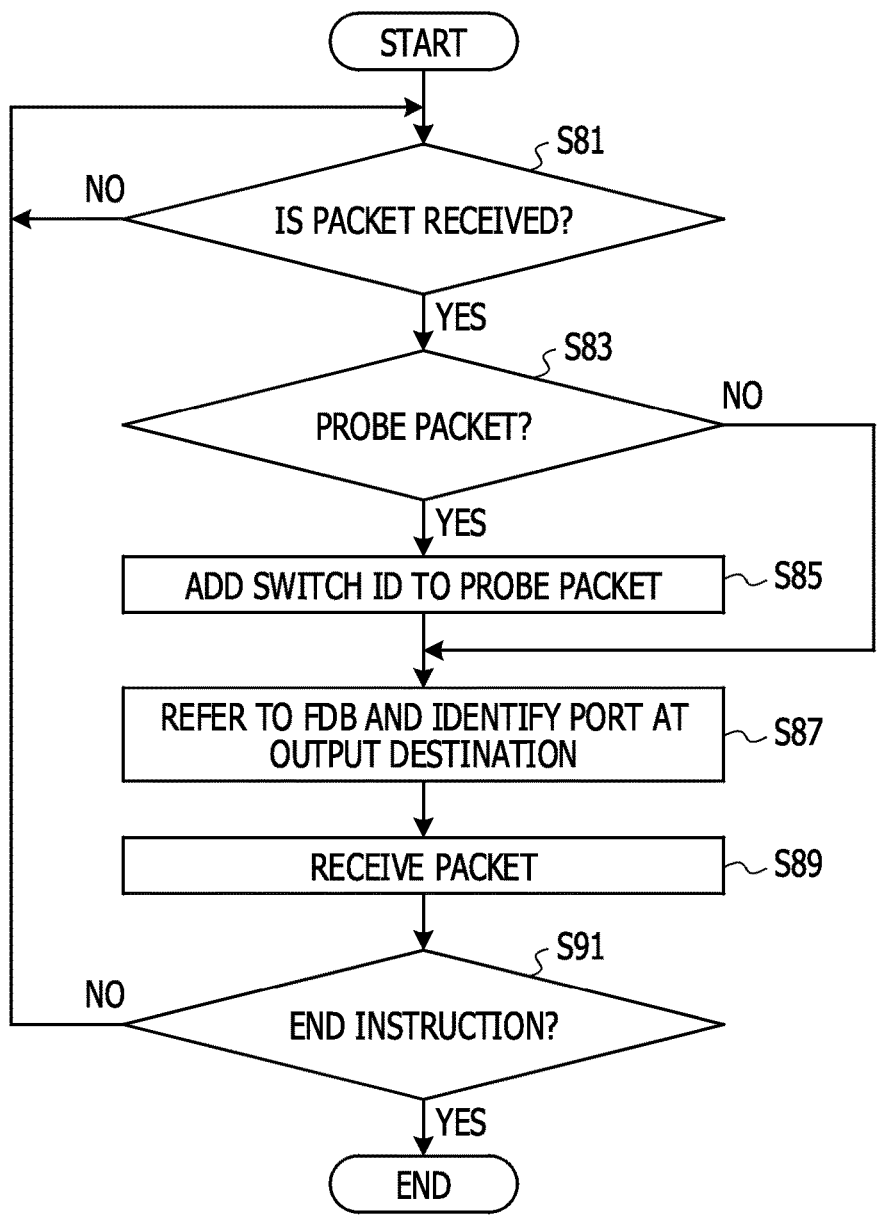
FIG. 23 illustrates a processing flow of processing executed by the switch.

First, the reception unit 10121 in the leaf switch 101 determines whether or not a packet is received (FIG. 23: step S81). In a case where the packet is not received (step S81: No route), the processing returns to step S81.

On the other hand, in a case where the packet is received (step S81: Yes route), the reception unit 10121 passes over the received packet to the relay control unit 10123. Then, the relay control unit 10123 determines whether or not the received packet is the probe packet based on the information included in the received packet (step S83).

In a case where the received packet is not the probe packet (step S83: No route), the processing shifts to step S87. On the other hand, in a case where the received packet is the probe packet (step S83: Yes route), the relay control unit 10123 causes the probe packet processing unit 10122 to execute the following processing. Specifically, the probe packet processing unit 10122 adds the switch ID of its own switch to the received probe packet (step S85).

The relay control unit 10123 refers to the FDB 10124 and identifies a port at the output destination of the received packet (step S87). Since the processing of identifying the port at the output destination by using the FDB 10124 has been widely discussed, the descriptions will be omitted herein. The relay control unit 10123 passes over the received packet and the information of the port at the output destination to the transmission unit 10125.

The transmission unit 10125 outputs the received packet to a transmission port indicated by the information of the port at the output destination, and the transmission port transmits the received packet (step S89).

The switching module 10120 determines whether or not the end instruction is accepted (step S91). In a case where the end instruction is not accepted (step S91: No route), the processing returns to step S81. On the other hand, in a case where the end instruction is accepted (step S91: Yes route), the processing is ended.

When the above-described processing is executed, since the switch IDs of the respective switches on the transfer route are added to the probe packet, it is possible to identify the transfer route by analyzing the probe packet.

Second Exemplary Embodiment

The forward route and the backward route set by the method according to the first exemplary embodiment are not necessarily set to be the same. However, the forward route and the backward route may preferably be the same in some cases. In view of the above, according to a second exemplary embodiment, the servers 11 to 18 and the controller 30 are operated such that the forward route and the backward route become the same.

The processing executed by the system according to the second exemplary embodiment will be described by using FIG. 24 to FIG. 31. First, processing executed will be described by the controller 30 according to the second exemplary embodiment using FIG. 24.

Figure 24:
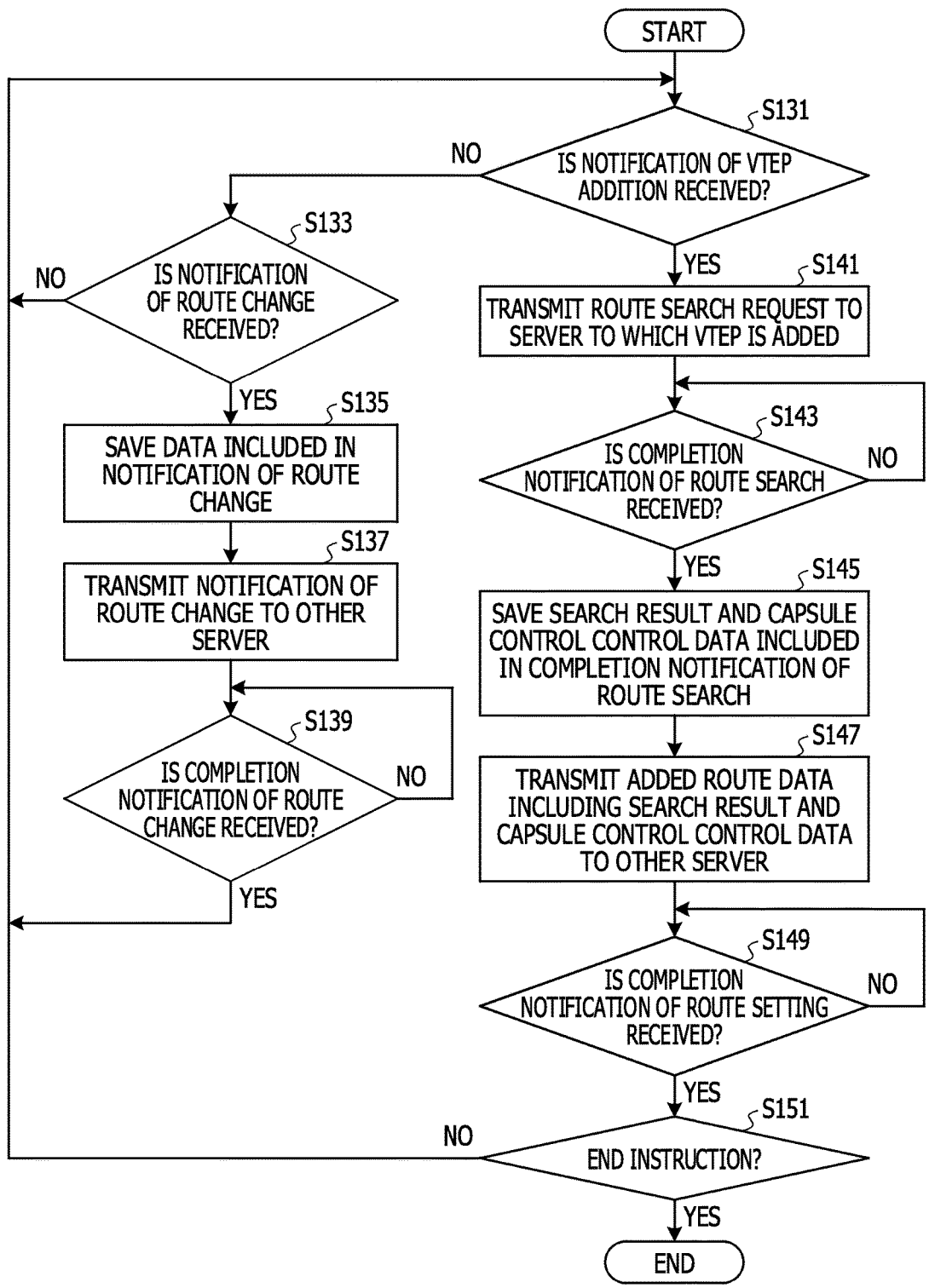
FIG. 24 illustrates a processing flow of the processing executed by the controller according to a second exemplary embodiment.

First, the controller 30 determines whether or not the notification indicating that the VTEP processing unit 1157 is added is received from one server among the servers 11 to 18 (FIG. 24: step S131). When the VTEP processing unit 1157 is added to the server, the communication based on the application executed by the virtual machine on the server is started, and therefore the setting of the route is to be performed. This notification includes the identifier of the added VTEP processing unit 1157.

In a case where the notification indicating that the VTEP processing unit 1157 is added is not received from any server (step S131: No route), the controller 30 determines whether or not the notification of the route change is received (step S133).

In a case where the notification of the route change is not received (step S133: No route), the processing returns to step S131. On the other hand, in a case where the notification of the route change is received (step S133: Yes route), the controller 30 saves the data included in the notification of the route change (step S135).

The controller 30 transmits the received notification of the route change to the server where there is a possibility for performing the communication with the server where the route change is performed (step S137).

The controller 30 determines whether or not the completion notification of the route change is received (step S139). In a case where the completion notification of the route change is not received (step S139: No route), the processing returns to step S139. On the other hand, in a case where the completion notification of the route change is received (step S139: Yes route), the processing returns to step S131. It is noted that the data included in the notification of the route change and the data included in the completion notification of the route change are data generated in each server, but the controller 30 also manages the data such that the controller 30 can manage the entire network. It is noted however that the data managed by the controller 30 is not directly related to the processing according to the present exemplary embodiment.

On the other hand, in a case where the notification indicating that the VTEP processing unit 1157 is added is received from one of the servers (step S131: Yes route), the controller 30 transmits the route search request to the server to which the VTEP processing unit 1157 is added (step S141). The route search request includes the identifier of the added VTEP processing unit 1157.

The controller 30 determines whether or not the completion notification of the route search from the server at the transmission destination of the route search request (step S143). In a case where the completion notification of the route search is not received (step S143: No route), the processing returns to step S143.

On the other hand, in a case where the completion notification of the route search is received (step S143: Yes route), the controller 30 executes the following processing. Specifically, the controller 30 saves the search result and the capsule control data included in the completion notification of the route search (step S145). It is noted that the search result and the capsule control data are data generated in each server, but the controller 30 also manages the data such that the controller 30 can manage the entire network. It is noted however that the search result and the capsule control data managed by the controller 30 are not directly related to the processing according to the present exemplary embodiment.

The controller 30 generates the added route data including the search result and the capsule control data and transmits the added route data to the server where there is a possibility for performing the communication with the server to which the VTEP processing unit 1157 is added (step S147). Since the communication between the virtual machines of the same tenant is performed in the data center, in step S147, the added route data is transmitted to the server that executes the virtual machines of the same tenant.

The controller 30 determines whether or not the completion notification of the route setting is received from the server at the transmission destination of the added route data (step S149). Since the completion notification of the route setting includes the entry of the capsule control data storage unit 1151, the controller 30 saves the entry.

In a case where the completion notification of the route setting is not received (step S149: No route), the processing returns to step S149.

On the other hand, in a case where the completion notification of the route setting is received (step S149: Yes route), the controller 30 determines whether or not the end instruction (for example, the shutdown instruction) is accepted (step S151). In a case where the end instruction is not accepted (step S151: No route), the processing returns to step S131. On the other hand, in a case where the end instruction is accepted (step S151: Yes route), the processing is ended.

Next, the processing executed by the server 11 will be described by using FIG. 25 to FIG. 31. It is noted that the processing executed by the server 11 will be described herein as an example, but the processing executed by the servers 12 to 18 is also similar to the processing executed by the server 11.

Figure 25:
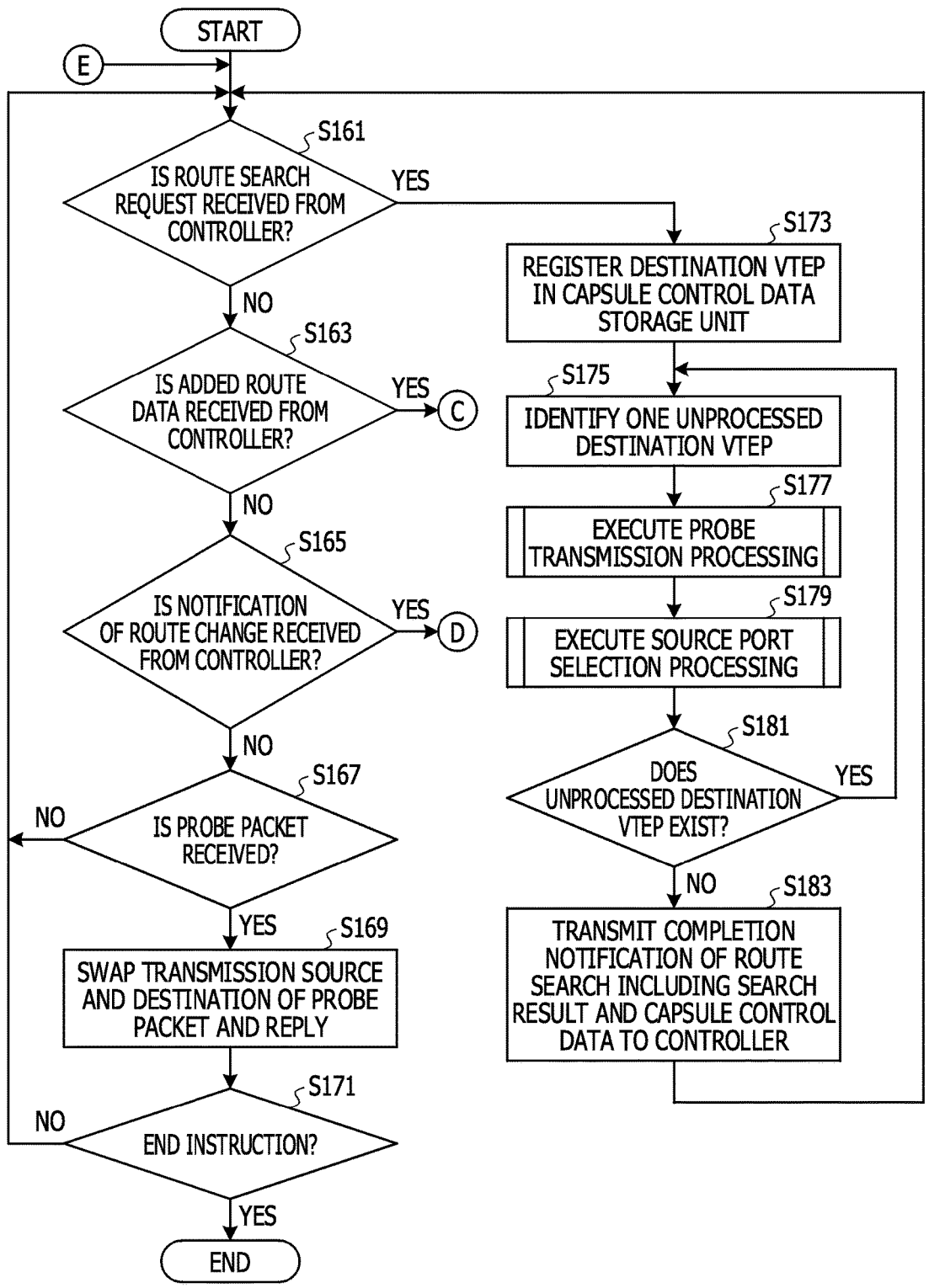
FIG. 25 illustrates a processing flow of the processing executed by the server according to the second exemplary embodiment.

First, the capsule control unit 1156 determines whether or not the route search request is received from the controller 30 (FIG. 25: step S161). In a case where the route search request is received from the controller 30 (step S161: Yes route), the capsule control unit 1156 stores an identifier or the like of the VTEP processing unit 1157 of the destination server (hereinafter, which will be referred to as a destination VTEP) in the capsule control data storage unit 1151 (step S173). It is noted that a plurality of identifiers are stored in the capsule control data storage unit 1151 in a case where the number of destination VTEPs is plural.

FIG. 26 illustrates an example of the capsule control data stored in the capsule control data storage unit 1151 according to the second exemplary embodiment. In an example of FIG. 26, the transmission source MAC address included in the internal header of the packet, the destination MAC address included in the internal header of the packet, the identifier of the destination VTEP, the source port information set in the external header of the packet of the forward route, and the source port information set in the external header of the packet of the backward route are stored. It is noted however that the source port information is not stored at the time of the processing in step S173.

The capsule control unit 1156 identifies one unprocessed destination VTEP from the capsule control data storage unit 1151 (step S175).

Then, the first control unit 11551 in the probe control unit 1155 executes the probe transmission processing (step S177). Since the probe transmission processing according to the second exemplary embodiment is the same as the probe transmission processing according to the first exemplary embodiment, descriptions thereof will be omitted.

The capsule control unit 1156 executes the source port selection processing (step S179). The source port selection processing will be described by using FIG. 27.

Figure 27:
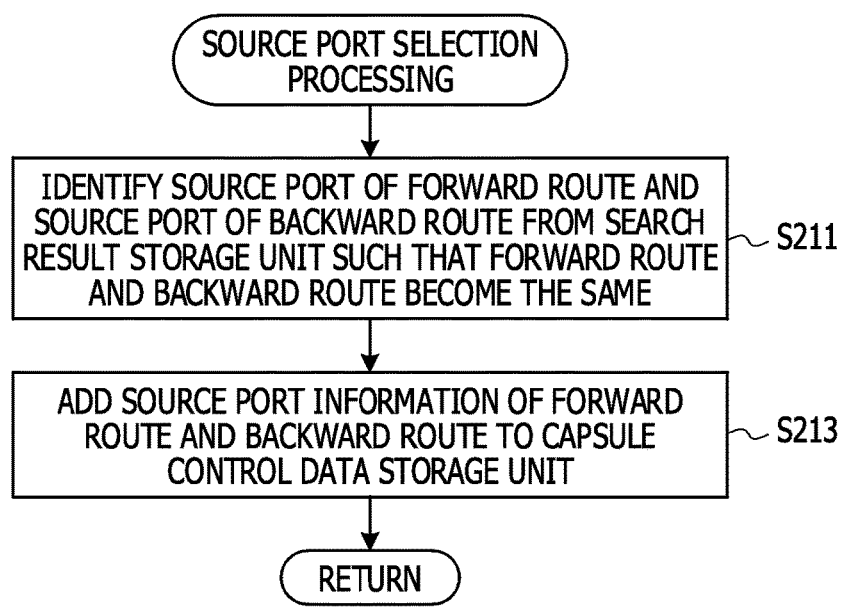
FIG. 27 illustrates a processing flow of the source port selection processing according to the second exemplary embodiment.

First, the capsule control unit 1156 identifies the source port of the forward route and the source port of the backward route from among the source ports storing the source port information stored in the search result storage unit 1153 such that the forward route and the backward route become the same (FIG. 27: step S211). For example, in a case where the data illustrated in FIG. 16 is stored in the search result storage unit 1153, when the source port information of the forward route is "0x0001" and also the source port information of the backward route is "0x0004", the forward route and the backward route are matched with each other.

The capsule control unit 1156 adds the source port information of the source port of the forward route and the source port information of the source port of the backward route identified in step S211 to the capsule control data storage unit 1151 (step S213). Since the source port information is not stored in step S173, the source port information of the forward route and the source port information of the backward route are added to the entry added in step S173. Then, the processing returns to the invoker.

Descriptions return to the explanation on FIG. 25, and the capsule control unit 1156 determines whether or not an unprocessed destination VTEP exists (step S181). In a case where the unprocessed destination VTEP exists (step S181: Yes route), the processing returns to step S175. On the other hand, in a case where the unprocessed destination VTEP does not exist (step S181: No route), the capsule control unit 1156 executes the following processing. Specifically, the capsule control unit 1156 transmits the completion notification of the route search including the search result and the capsule control data to the controller 30 (step S183). Then, the processing returns to step S161.

On the other hand, in a case where the route search request is not received from the controller 30 (step S161: No route), the capsule control unit 1156 determines whether or not the added route data is received from the controller 30 (that is, its own server is the destination server) (step S163).

In a case where the added route data is received from the controller 30 (step S163: Yes route), the processing shifts to step S191 of FIG. 28 via a terminal C.

Figure 28:
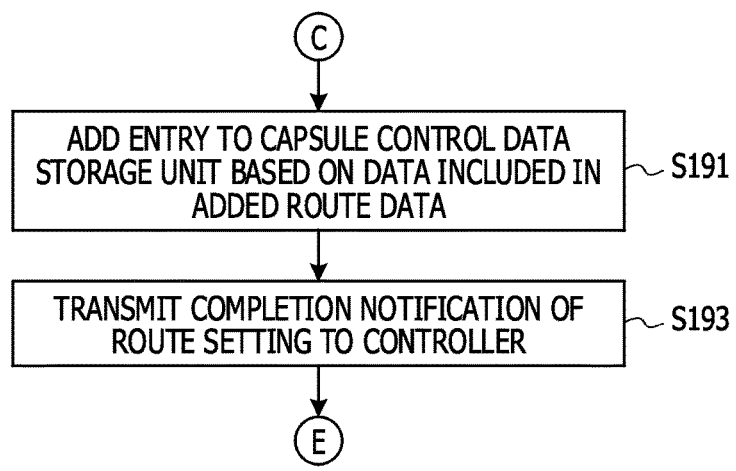
FIG. 28 illustrates a processing flow of the processing executed by the server according to the second exemplary embodiment.

Descriptions shift to the explanation on FIG. 28, and the capsule control unit 1156 adds the entry to the capsule control data storage unit 1151 based on the information included in the added route data (FIG. 28: step S191). For example, in a case where the capsule control data included in the added route data is the data illustrated in FIG. 26, the entry illustrated in FIG. 29 is added in step S191. In FIG. 29, the destination MAC address and the transmission source MAC address are swapped, the identifier of the added VTEP processing unit 1157 is set in the destination VTEP, the source port information of the external header of the forward route included in the added route data and the source port information of the external header of the backward route are swapped.

The capsule control unit 1156 transmits the completion notification of the route setting including the entry added in step S191 to the controller 30 (step S193). The processing returns to step S161 of FIG. 25 via a terminal E.

Descriptions return to the explanation on FIG. 25, and, in a case where the added route data is not received from the controller 30 (step S163: No route), the capsule control unit 1156 determines whether or not the notification of the route change is received from the controller 30 (step S165). In a case where the notification of the route change is received from the controller 30 (step S165: Yes route), the processing shifts to step S201 of FIG. 30 via a terminal D.

Figure 30:
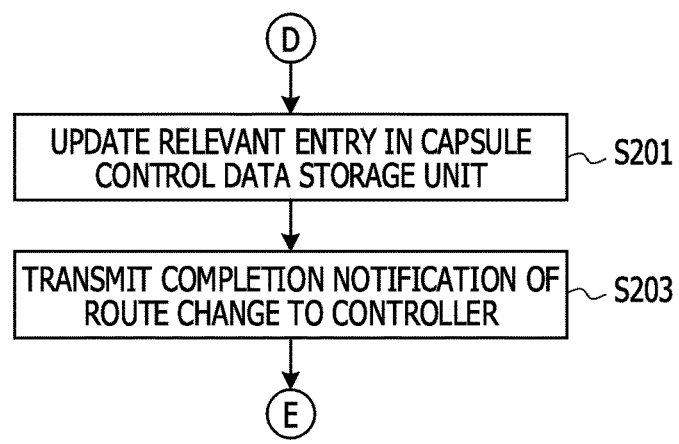
FIG. 30 illustrates a processing flow of the processing executed by the server according to the second exemplary embodiment.

Descriptions shift to the explanation on FIG. 30, and the capsule control unit 1156 updates the entry in the capsule control data storage unit 1151 in accordance with the data included in the notification of the route change (FIG. 30: step S201). Since the route is changed by the server of the communication partner, the entry in the capsule control data storage unit 1151 is updated such that the forward route and the backward route becomes the same in the communication with the communication partner.

The capsule control unit 1156 transmits the completion notification of the route change including the entry updated in step S201 to the controller 30 (step S203). Then, the processing returns to step S161 of FIG. 25 via the terminal E.

Descriptions return to the explanation on FIG. 25, and, in a case where the notification of the route change is not received from the controller 30 (step S165: No route), the capsule control unit 1156 determines whether or not the probe packet is received (step S167).

In a case where the probe packet is not received (step S167: No route), the processing returns to step S161. On the other hand, in a case where the probe packet is received (step S167: Yes route), the first control unit 11551 transmits the packet in which the transmission source and the destination of the received probe packet are swapped to the transmission source of the probe packet (step S169).

The capsule control unit 1156 determines whether or not the end instruction is accepted (step S171). In a case where the end instruction is not accepted (step S171: No route), the processing returns to step S161. On the other hand, in a case where the end instruction is accepted (step S171: Yes route), the processing is ended.

Figure 31:
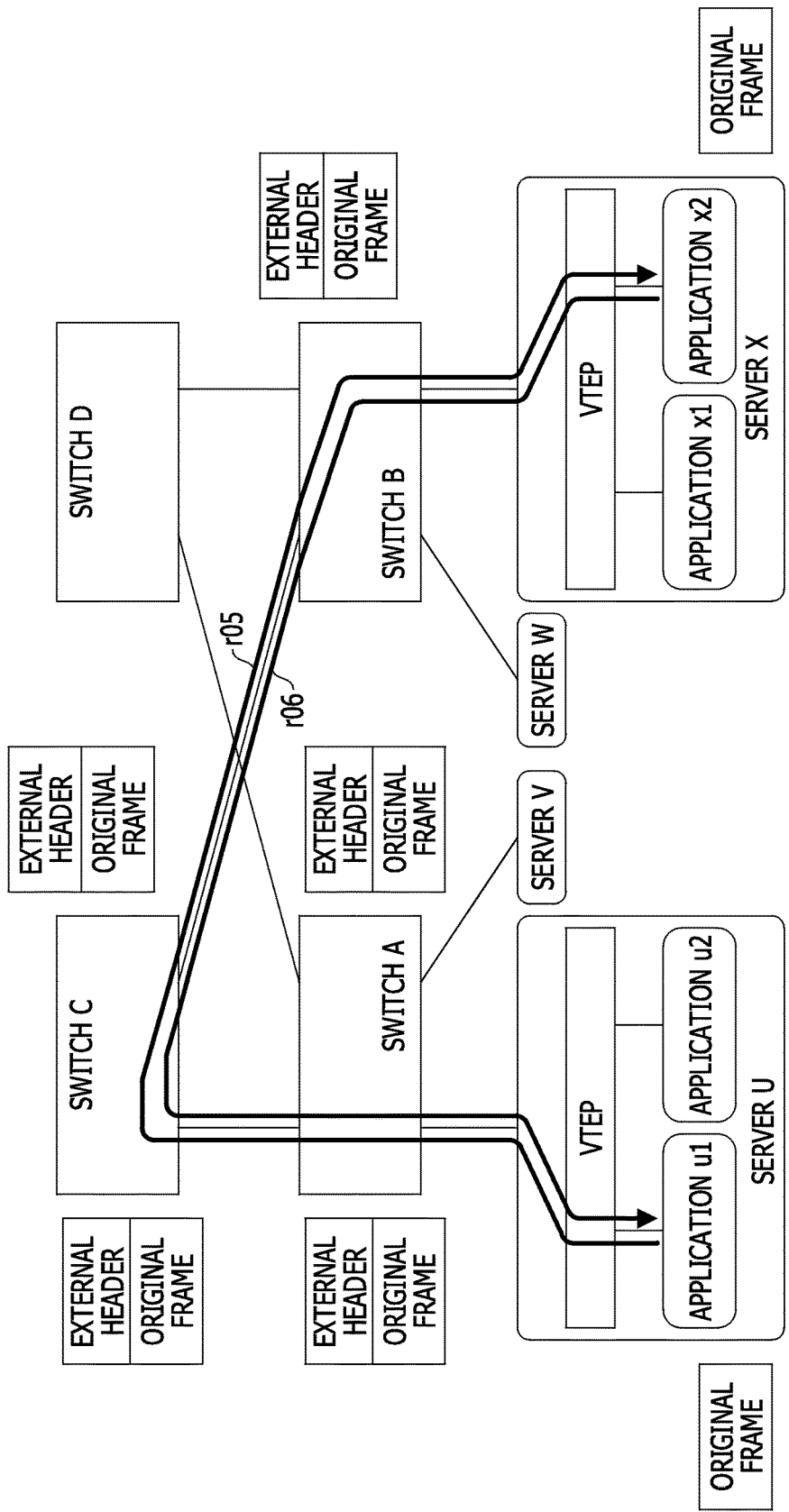
FIG. 31 is an explanatory diagram for describing settings of a forward route and a backward route.

When the above-described processing is executed, for example, as illustrated in FIG. 31, it is possible to set the routes such that the forward route and the backward route becomes the same. In an example of FIG. 31, the forward route and the backward route are matched with each other in a communication performed by an application u1 and an application x2. In this case, the source port information of the forward route and the source port information of the backward route are not necessarily matched with each other.

One exemplary embodiment of the present disclosure has been described above, but the present disclosure is not limited to this. For example, there are cases where the block configurations of the servers 11 to 18, the leaf switches 101 to 104, the spine switches 201 to 204, and the controller 30 described above are not matched with an actual program module.

In addition, the configurations of the respective tables described above are examples and may not necessarily be the same as the above-described configurations. Furthermore, the orders of the processing can also be swapped in the processing flow as long as the processing result is not changed. Furthermore, the processing may be executed in parallel.

In addition, the route setting is executed by the server according to the first and second exemplary embodiments, but the route setting may be executed by the controller 30.

The above-described exemplary embodiments of the present disclosure are summarized as follows.

A route search system according to a first mode of the present exemplary embodiment includes (A) a first information processing apparatus (for example, the server 11) coupled to a network where a route in which a packet is transmitted is controlled based on transmission source port information set in a header of the packet, (B) a second information processing apparatus (for example, the server 18) coupled to the network, and (C) a management apparatus (for example, the controller 30) configured to manage the first information processing apparatus and the second information processing apparatus. Then, the first information processing apparatus includes (a1) a first transmission unit (for example, the first control unit 11551) configured to transmit a plurality of packets having different transmission source port information to the second information processing apparatus in a case where a request with regard to a search for a route between the first information processing apparatus and the second information processing apparatus is received from the management apparatus, (a2) an identification unit (for example, the capsule control unit 1156) configured to identify the transmission source port information set in the packets for each route based on route information and transmission source port information included in response packets with respect to the plurality of packets, (a3) a second transmission unit (for example, the second control unit 11552) configured to transmit a probe packet in which the identified transmission source port information is set for each route to the second information processing apparatus.

Since the probe packet is transmitted with regard to each route instead of sequentially setting the transmission source port information to set the probe packet, the probe packets are not wastefully transmitted, and the number of probe packets can be reduced. According to this, it is possible to reduce influences affected on a transfer of a packet other than the probe packet (for example, the normal packet).

In addition, the present route search system may further include (D) a plurality of switches. Then, the route information may also include identifiers of switches on the route among the plurality of switches. Then, each of the switches on the route may add identification information of the switch to the received packet. It becomes possible to determine whether the routes are the same or different from each other based on the identifiers of the switches.

In addition, the second information processing apparatus (b1) may generate a response packet in which a transmission source address and a destination address included in the packet are swapped with regard to each of the plurality of received packets and transmit the generated response packet to the first information processing apparatus. It becomes possible to identify a route of the packet in which certain transmission source port information is set (that is, the forward route) and a route of the response packet (that is, the backward route).

In addition, the first information processing apparatus may further include (a4) a first change unit (for example, the change unit 1158) configured to change, in a case where an abnormality of a first route is detected based on the probe packet transmitted with regard to the first route, the transmission source port information set in the packet transmitted to the second information processing apparatus in the first route to the transmission source port information identified with regard to a second route that is different from the first route. It becomes possible to collectively change the transmission source port information related to the route abnormality.

In addition, the first information processing apparatus may further include (a5) a second change unit (for example, the change unit 1158) configured to change the transmission source port information set in the packet transmitted by the first application to the second application to the transmission source port information identified with regard to the second route that is different from the first route in a case where an abnormality is detected in a communication in the first route between a first application in the first information processing apparatus and a second application in the second information processing apparatus. It becomes possible to change the transmission source port information with regard to only the particular communication flow.

In addition, the identification unit (a21) may transmit a response with respect to a request to the management apparatus. Then, the management apparatus (c1) may transmit a second request with regard to the setting of the route between the second information processing apparatus and the first information processing apparatus to the second information processing apparatus in a case where the response to the request is received. Then, the second information processing apparatus (b2) may set the transmission source port information corresponding to one route among the routes between the second information processing apparatus and the first information processing apparatus as the transmission source port information set in the packet transmitted to the first information processing apparatus in a case where the second request is received. It becomes possible to perform the setting with regard to not only the route from the first information processing apparatus to the second information processing apparatus but also the route from the second information processing apparatus to the first information processing apparatus.

In addition, the identification unit (a21) may transmit a response with respect to the request, the response including information with regard to a third route used for a communication with the second information processing apparatus, to the management apparatus. Then, in a case where the response with respect to the request is received, the management apparatus (c2) may transmit a second request, which includes the information about the third route, with regard to the setting of the route between the second information processing apparatus and the first information processing apparatus to the second information processing apparatus. Then, the second information processing apparatus (b3) may set the transmission source port information corresponding to the third route as the transmission source port information set in the packet transmitted to the first information processing apparatus in a case where the second request is received. It becomes possible to set the route from the first information processing apparatus to the second information processing apparatus and the route from the second information processing apparatus to the first information processing apparatus to be the same.

A route search method according to a second mode of the present exemplary embodiment includes processing of (E) transmitting, in a case where a request with regard to a search of a route with another information processing apparatus is received from a management apparatus configured to manage an information processing apparatus and the other information processing apparatus, a plurality of packets having different transmission source port information to the other information processing apparatus, (F) identifying, based on route information and transmission source port information included in response packets with respect to the plurality of packets, the transmission source port information set in the packets for each route, and (G) transmitting a probe packet in which the identified source port information is set with regard to each route to the other information processing apparatus.

A route search method according to a third mode of the present exemplary embodiment includes processing of (H) transmitting a first request with regard to a search for a route between a first information processing apparatus coupled to a network where a route in which a packet is transmitted is controlled based on transmission source port information set in a header of the packet and a second information processing apparatus coupled to the network to the information processing apparatus, and (I) transmitting a second request with regard to a search for a route between the second information processing apparatus and the first information processing apparatus to the second information processing apparatus in a case where a response with respect to the transmitted first request is received.

It is noted that a program for causing one or a plurality of computers to execute the processing based on the above-described method can be created, and the program is stored, for example, in a computer-readable storage medium or a storage device such as a flexible disc, a CD-ROM, an opto-magnetic disc, a semiconductor memory, or a hard disc. It is noted that an intermediate processing result is temporarily stored in a storage device such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A system comprising:
 a first switching apparatus coupled to a network and including a plurality of ports;
 a first information processing apparatus coupled to the first switching apparatus and including a first memory and a first processor coupled to the first memory;
 a second switching apparatus coupled to the network; and
 a second information processing apparatus coupled to the second switching apparatus and including a second memory and a second processor coupled to the second memory,
 wherein
 the first processor is configured to:
  generate a first packet including first port information indicating a first port included in the plurality of ports of the first switching apparatus, and
  transmit the first packet to the first switching apparatus,
 the first switching apparatus is configured to:
  receive the first packet transmitted from the first processor, and
  transmit the first packet from the first port indicated by the first port information,
 the second switching apparatus is configured to:
  receive the first packet transmitted from the first switching apparatus, and
  transmit the first packet to the second information processing apparatus,
 the second processor is configured to:
  receive the first packet from the second switching apparatus, the first packet received by the second processor including first route information indicating a first route through which the first packet has passed in the network between the first switching apparatus and the second switching apparatus, and transmit a second packet including the first port information and the first route information to the first information processing apparatus via the second switching apparatus in accordance with reception of the first packet, and the first processor is configured to:
receive the second packet via the first switching apparatus, and
store, in the first memory, the first route information and the first port information included in the second packet.

2. The system according to claim 1, further comprising:
a third switching apparatus,
wherein
the first route includes the third switching apparatus,
the third switching apparatus receives the first packet,
the third switching apparatus adds an identifier of the third switching apparatus to the first packet, and
the first route information includes the identifier of the third switching apparatus.

3. The system according to claim 1, wherein the first processor is configured to:
generate a third packet including the first port information,
transmit the third packet to the second information processing apparatus via the first switching apparatus, the third packet being transmitted to the second information processing apparatus via the first route,
generate a fourth packet including a second port information indicating the second port different from the first port among the plurality of ports included in the first switching apparatus when a fail occurs in the transmission of the third packet to the second information processing apparatus, and
transmit the fourth packet to the second information processing apparatus via the first switching apparatus,
the first switching apparatus is configured to transmit the fourth packet to the second information processing apparatus from the second port indicated by the second port information, and
the fourth packet is transmitted to the second information processing apparatus via a second route that is different from the first route.

4. The system according to claim 1, wherein the first processor is configured to:
receive a first request from a management apparatus configured to manage the first information processing apparatus, and
transmit the first packet in accordance with the first request.

5. The system according to claim 3, wherein the first processor is configured to:
when an error of a communication performed between a first application in the first information processing apparatus and a second application in the second information processing apparatus via the first route is detected, transmit a fifth packet transmitted by the first application to the second application through the second route.

6. The system according to claim 1, further comprising:
a management apparatus including a third memory and a third processor coupled to the third memory, wherein the first processor is configured to:
receive a first request from the management apparatus, and
transmit the first packet in response to the first request.

7. The system according to claim 6, wherein
the first processor is configured to transmit a first response in accordance with the first request to the management apparatus,
the third processor is configured to:
receive the first response, and
transmit a second request to the second information processing apparatus, and
the second processor is configured to:
receive the second request,
generate a sixth packet including third port information indicating a third port among a plurality of ports of the second switching apparatus based on the second request, and
transmit the sixth packet to the second switching apparatus.

8. The system according to claim 7, wherein
the first processor is configured to transmit the first response including third route information indicating a third route used in the communication between the first information processing apparatus and the second information processing apparatus to the management apparatus,
the third processor is configured to transmit the second request including the third route information to the second information processing apparatus in accordance with the first response, and
the second processor is configured to set the third port information in the sixth packet based on the third route information included in the second request.

9. A method using a system including a first switching apparatus coupled to a network and including a plurality of ports, a first information processing apparatus coupled to the first switching apparatus, a second switching apparatus coupled to the network, and a second information processing apparatus coupled to the second switching apparatus, the method comprising:
generating, by the first information processing apparatus, a first packet including first port information indicating a first port included in the plurality of ports of the first switching apparatus;
transmitting, by the first information processing apparatus, the first packet to the first switching apparatus;
receiving, by the first switching apparatus, the first packet transmitted from the first processor;
transmitting, by the first switching apparatus, the first packet from the first port indicated by the first port information;
receiving, by the second switching apparatus, the first packet transmitted from the first switching apparatus;
transmitting, by the second switching apparatus, the first packet to the second information processing apparatus;
receiving, by the second information processing apparatus, the first packet from the second switching apparatus, the first packet received by the second information processing apparatus including first route information indicating a first route through which the first packet has passed in the network between the first switching apparatus and the second switching apparatus;
transmitting, by the second information processing apparatus, a second packet including the first port information and the first route information to the first information processing apparatus via the second switching apparatus in accordance with reception of the first packet;
receiving, by the first information processing apparatus, the second packet via the first switching apparatus; and storing, by the first information processing apparatus, the first route information and the first port information included in the second packet.

10. The method according to claim 9, wherein
the system further comprising a third switching apparatus, the first route includes the third switching apparatus, and the method further comprises:
 receiving, by the third switching apparatus, the first packet, and
 adding, by the third switching apparatus, an identifier of the third switching apparatus to the first packet, and
 the first route information includes the identifier of the third switching apparatus.

11. The method according to claim 9 further comprising:
generating, by the first information processing apparatus, a third packet including the first port information;
transmitting, by the first information processing apparatus, the third packet to the second information processing apparatus via the first switching apparatus, the third packet being transmitted to the second information processing apparatus via the first route;
generating, by the first information processing apparatus, a fourth packet including a second port information indicating the second port different from the first port among the plurality of ports included in the first switching apparatus when a fail occurs in the transmission of the third packet to the second information processing apparatus;
transmitting, by the first information processing apparatus, the fourth packet to the second information processing apparatus via the first switching apparatus; and
transmitting, the first switching apparatus, the fourth packet to the second information processing apparatus from the second port indicated by the second port information,
wherein the fourth packet is transmitted to the second information processing apparatus via a second route that is different from the first route.

12. The method according to claim 9 further comprising:
receiving, by the first information processing apparatus, a first request from a management apparatus configured to manage the first information processing apparatus; and
transmitting, by the first information processing apparatus, the first packet in accordance with the first request.

13. The method according to claim 11 further comprising:
when an error of a communication performed between a first application in the first information processing apparatus and a second application in the second information processing apparatus via the first route is detected, transmitting, by the first information processing apparatus, a fifth packet which is to be transmitted from the first application to the second application through the second route.

14. The method according to claim 9, wherein
the system further comprises a management apparatus, and
the method further comprises:
 receiving, by the first information processing apparatus, a first request from the management apparatus; and
 transmitting, by the first information processing apparatus, the first packet in response to the first request.

15. The method according to claim 14 further comprising:
transmitting, by the first information processing apparatus, a first response in accordance with the first request to the management apparatus;
receiving, by the management apparatus, the first response;
transmitting, by the management apparatus, a second request to the second information processing apparatus;
receiving, by the first information processing apparatus, the second request;
generating, by the first information processing apparatus, a sixth packet including third port information indicating a third port among a plurality of ports of the second switching apparatus based on the second request; and
transmitting, by the first information processing apparatus, the sixth packet to the second switching apparatus.

16. The method according to claim 15 further comprising:
transmitting, by the first information processing apparatus, the first response including third route information indicating a third route used in the communication between the first information processing apparatus and the second information processing apparatus to the management apparatus;
transmitting, by the management apparatus, the second request including the third route information to the second information processing apparatus in accordance with the first response; and
setting, by the second information processing apparatus, the third port information in the sixth packet based on the third route information included in the second request.

* * * * *